US012793606B2

(12) United States Patent
Park et al.

(10) Patent No.: US 12,793,606 B2
(45) Date of Patent: Nov. 10, 2026

(54) IMAGE DISPLAY APPARATUS

(71) Applicant: LG ELECTRONICS INC., Seoul (KR)

(72) Inventors: Donghun Park, Seoul (KR); Jongmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 18/659,910

(22) Filed: May 9, 2024

(65) Prior Publication Data

US 2025/0218337 A1 Jul. 3, 2025

(30) Foreign Application Priority Data

Jan. 2, 2024 (KR) ........................ 10-2024-0000513

(51) Int. Cl.
*G09G 3/20* (2006.01)

(52) U.S. Cl.
CPC ......... *G09G 3/2096* (2013.01); *G09G 3/2007* (2013.01); *G09G 2320/0626* (2013.01); *G09G 2320/066* (2013.01); *G09G 2340/0407* (2013.01)

(58) Field of Classification Search
CPC ............... G09G 3/2096; G09G 3/2007; G09G 2320/0626; G09G 2320/066; G09G 2340/0407; G09G 2320/0271; G09G 5/00; G09G 2320/0613; H04N 5/208; H04N 5/57
See application file for complete search history.

(56) References Cited

U.S. PATENT DOCUMENTS

2005/0128358 A1 6/2005 Nakajima et al.
2005/0190300 A1 9/2005 Aoki et al.
2012/0106922 A1* 5/2012 Tsukagoshi .......... H04N 9/3182 386/230
2015/0125090 A1 5/2015 Mizobuchi et al.
2020/0310537 A1* 10/2020 Simmons ........... G02B 27/0172

FOREIGN PATENT DOCUMENTS

CN 105578106 5/2018

OTHER PUBLICATIONS

European Patent Office Application Serial No. 24176646.8, Search Report dated Sep. 27, 2024, 13 pages.

* cited by examiner

*Primary Examiner* — Chong Wu
(74) *Attorney, Agent, or Firm* — LEE, HONG, DEGERMAN, KANG & WAIMEY

(57) ABSTRACT

The present disclosure relates to an image display apparatus. The image display apparatus according to an embodiment of the present disclosure includes: a display; and a signal processing device to output an image signal to the display, wherein the signal processing device is configured to perform dynamic contrast processing after performing sharpness processing of the image signal, and adjust the sharpness of the image signal based on the amount or slope of amplification of contrast by the dynamic contrast processing. Accordingly, noise amplification can be reduced, or sharpness can be improved.

17 Claims, 19 Drawing Sheets

IMAGE DISPLAY APPARATUS

CROSS-REFERENCE TO RELATED APPLICATION(S)

Pursuant to 35 U.S.C. § 119, this application claims the benefit of earlier filing date and right of priority to Korean Application No(s). 10-2024-0000513, filed on Jan. 2, 2024, the contents of which are all incorporated by reference herein in its entirety.

BACKGROUND

1. Field

The present disclosure relates to an image display apparatus, and more particularly, to an image display apparatus capable of reducing noise amplification or improving sharpness.

2. Description of the Related Art

An image display apparatus is an apparatus with the function of providing images that can be viewed by the user. The user can view various images through the image display apparatus.

Meanwhile, some attempts are being made such as sharpness processing and contrast processing, in order to improve the picture quality of an image displayed on the image display apparatus.

However, performing contrast processing after sharpness processing may lead to problems such as amplification of noise in an image signal.

SUMMARY

An object of the present disclosure is to provide an image display apparatus capable of reducing noise amplification or improving sharpness.

Another object of the present disclosure is to provide an image display apparatus capable of reducing noise amplification in a low gray level area or improving sharpness in a high gray level area.

In accordance with one embodiment of the present disclosure, the above and other objects may be accomplished by the provision of an image display apparatus comprising: a display; and a signal processing device to output an image signal to the display, wherein the signal processing device is configured to perform dynamic contrast processing after performing sharpness processing of the image signal, and adjust the sharpness of the image signal based on the amount or slope of amplification of contrast by the dynamic contrast processing.

Meanwhile, in response to an increase of the amount or slope of amplification of contrast by the dynamic contrast processing, the signal processing device may be configured to decrease the strength of the sharpness while adjusting the sharpness.

Meanwhile, in response to the amount or slope of amplification of contrast by the dynamic contrast processing exceeding a predetermined value, the signal processing device may be configured to decrease the strength of the sharpness while adjusting the sharpness.

Meanwhile, while adjusting the sharpness, the signal processing device may be configured to decrease the strength of the sharpness as the amount of slope of amplification increases, in a state in which the amount or slope of amplification of contrast by the dynamic contrast processing exceeds a predetermined value.

Meanwhile, in response to the amount or slope of amplification of contrast by the dynamic contrast processing being below the predetermined value, the signal processing device may be configured to not adjust the sharpness.

Meanwhile, the signal processing device may be configured to increase the strength of the sharpness as the amount or slope of amplification of contrast by the dynamic contrast processing decreases, while adjusting the sharpness.

Meanwhile, while adjusting the sharpness, the signal processing device may be configured to increase the strength of the sharpness as the amount or slope of amplification decreases, in a state in which the amount or slope of amplification of contrast by the dynamic contrast processing is below a predetermined value.

Meanwhile, the signal processing device may be configured to perform noise reduction before the sharpness processing.

Meanwhile, in response to the amount or slope of amplification of contrast by the dynamic contrast processing being below a predetermined value, the signal processing device may be configured to control the strength of the sharpness to be at a first level while adjusting the sharpness, and in response to the amount or slope of amplification of contrast by the dynamic contrast processing exceeding the predetermined value, the signal processing device may be configured to control the strength of the sharpness to be at a second level lower than the first level while adjusting the sharpness.

Meanwhile, the signal processing device may be configured to gradually change the strength of the sharpness from the first level to the second level or from the second level to the first level, while adjusting the sharpness.

Meanwhile, while processing the dynamic contrast, in response to the gray level of the image signal being below the first gray level, the signal processing device may be configured to control the output luminance to be lower than the input luminance, and, while processing the dynamic contrast, in response to the gray level of the image signal exceeding the first gray level, the signal processing device may be configured to control the output luminance to be higher than the input luminance.

Meanwhile, the signal processing device may be configured decrease noise amplification or increase the sharpness based on the amount of amplification of contrast by the dynamic contrast processing.

Meanwhile, the signal processing device may be configured to adjust the sharpness of the image signal more in sports mode than in movie mode.

Meanwhile, in response to the gray level of the image signal being below the first gray level, the signal processing device may be configured to decrease noise amplification, and in response to the gray level of the image signal exceeding the first gray level, the signal processing device may be configured to increase the sharpness.

Meanwhile, while processing the dynamic contrast, the signal processing device may be configured to change the color spectrum of the image signal based on contrast gain.

Meanwhile, while processing the dynamic contrast, the signal processing device may be configured to increase the color spectrum of the image signal as contrast gain increases, and decrease the color spectrum of the image signal as the contrast gain decreases.

In accordance with another embodiment of the present disclosure, the above and other objects may be accomplished by the provision of an image display apparatus comprising: a display; and a signal processing device to output an image signal to the display, wherein the signal processing device is configured to perform dynamic contrast processing after performing sharpness processing of the image signal, and in response to the amount or slope of amplification of contrast by the dynamic contrast processing exceeding a predetermined value, the signal processing device is configured to decrease the strength of the sharpness while adjusting the sharpness.

Meanwhile, while adjusting the sharpness, the signal processing device may be configured to decrease the strength of the sharpness as the amount of slope of amplification increases, in a state in which the amount or slope of amplification of contrast by the dynamic contrast processing exceeds a predetermined value.

Meanwhile, in response to the amount or slope of amplification of contrast by the dynamic contrast processing being below the predetermined value, the signal processing device may be configured to not adjust the sharpness.

In accordance with further another embodiment of the present disclosure, the above and other objects may be accomplished by the provision of an image display apparatus comprising: a display; and a signal processing device to output an image signal to the display, wherein the signal processing device is configured to perform dynamic contrast processing after performing sharpness processing of the image signal, and in response to the amount or slope of amplification of contrast by the dynamic contrast processing being below a predetermined value, the signal processing device is configured to control the strength of the sharpness to be at a first level while adjusting the sharpness, and in response to the amount or slope of amplification of contrast by the dynamic contrast processing exceeding the predetermined value, the signal processing device is configured to control the strength of the sharpness to be at a second level lower than the first level while adjusting the sharpness.

Meanwhile, the signal processing device may be configured to gradually change the strength of the sharpness from the first level to the second level or from the second level to the first level, while adjusting the sharpness.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
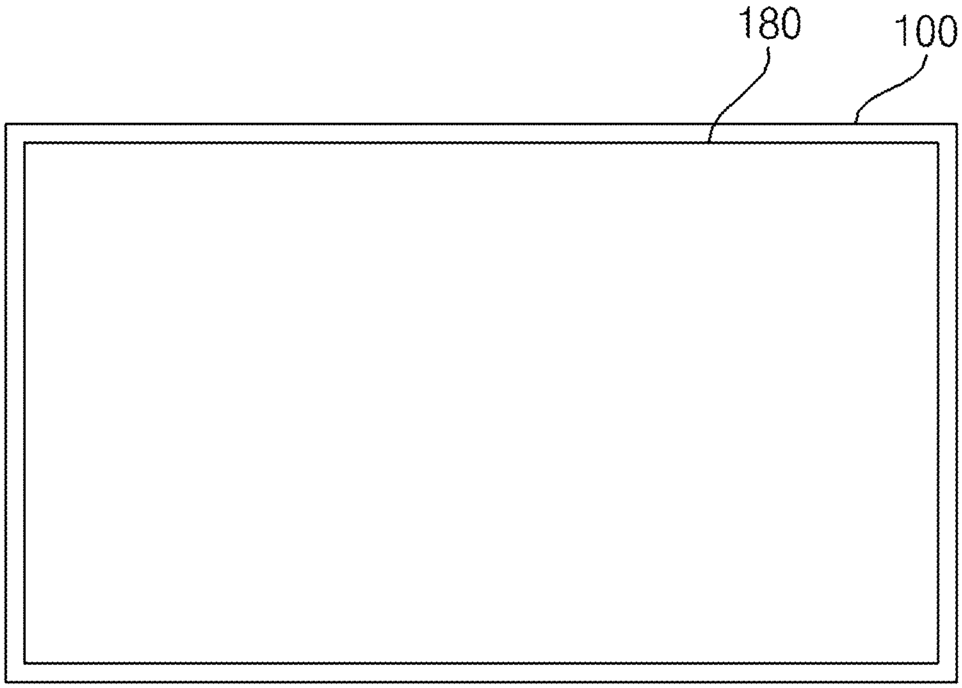
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

Meanwhile, the display 180 may be implemented by one of various panels. For example, the display 180 may be one of a liquid crystal display panel (LCD panel), an organic light emitting panel (OLED panel), and an inorganic light emitting panel (LED panel).

An image display apparatus 100 according to an embodiment of the present disclosure includes a display 180 and a signal processing device (170 of FIG. 2) to output an image signal to the display 180. The signal processing apparatus 170 performs dynamic contrast processing after processing the sharpness of the image signal, and adjust the sharpness of the image signal, based on the amount or slope of amplification of contrast by the dynamic contrast processing. Accordingly, noise amplification can be reduced, or sharpness can be improved. In particular, noise amplification in a low gray level area can be reduced, or sharpness in a high gray level area can be improved.

Meanwhile, an image display apparatus according to another embodiment of the present disclosure includes a display 180 and a signal processing device 170 to output an image signal to the display 180. The signal processing apparatus 170 performs dynamic contrast processing after processing the sharpness of the image signal, and in response to the amount or slope of amplification of contrast by the dynamic contrast processing exceeding a predetermined value, it is configured to decrease the strength of the sharpness while adjusting the sharpness. Accordingly, noise amplification can be reduced, or sharpness can be improved. In particular, noise amplification in a low gray level area can be reduced, or sharpness in a high gray level area can be improved.

Meanwhile, an image display apparatus according to further another embodiment of the present disclosure includes a display 180 and a signal processing device 170 to output an image signal to the display 180. The signal processing apparatus 170 performs dynamic contrast processing after processing the sharpness of the image signal, and in response to the amount or slope of amplification of contrast by the dynamic contrast processing being below a predetermined value, it controls the strength of the sharpness to be at a first level while adjusting the sharpness, and in response to the amount or slope of amplification of contrast by the dynamic contrast processing exceeding the predetermined value, it controls the strength of the sharpness to be at a second level lower than the first level while adjusting the sharpness. Accordingly, noise amplification can be reduced, or sharpness can be improved. In particular, noise amplification in a low gray level area can be reduced, or sharpness in a high gray level area can be improved.

Various methods of operating the above described image display apparatus 100 will be described in more detail with reference to FIG. 8 and the subsequent drawings.

Meanwhile, the image display apparatus 100 of FIG. 1 may be a TV, a monitor, a tablet PC, a mobile terminal, a vehicle display, etc.

Figure 2:
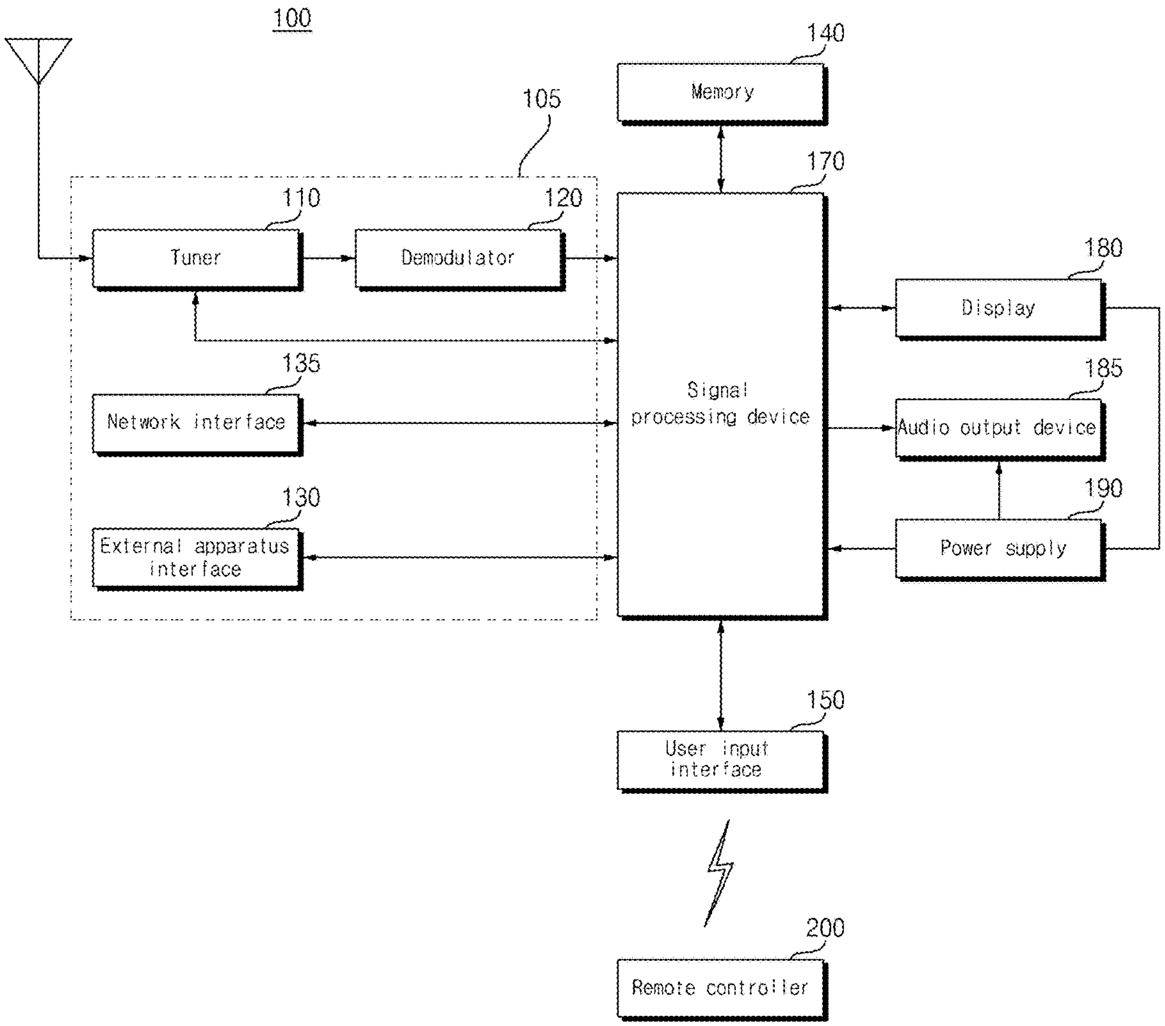
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processing device 170, a display 180, and an audio output device 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, the tuner 110 converts the digital broadcast signal into a digital IF (DIF) signal and, if the selected RF broadcast signal is an analog broadcast signal, the tuner 110 converts the analog broadcast signal into an analog baseband image or voice (CVBS/SIF) signal. That is, the tuner 110 may process a digital broadcast signal or an analog broadcast signal. The analog baseband image or voice (CVBS/SIF) signal output from the tuner 110 may be directly input to the signal processing device 170.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may be configured to perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus, such as a digital versatile disk (DVD), a Blu ray, a game equipment, a camera, a camcorder, a computer (note book), and a set-top box, and may be configured to perform an input/output operation with an external apparatus.

The A/V input and output device may receive image and audio signals from an external apparatus. Meanwhile, a wireless transceiver (not shown) may be configured to perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external apparatus interface 130, or process the demultiplexed signals to generate and output a signal for image or audio output.

The image signal processed by the signal processing device 170 is input to the display 180, and may be displayed as an image corresponding to the image signal. In addition, the image signal processed by the signal processing device 170 may be input to the external output apparatus through the external apparatus interface 130.

The audio signal processed by the signal processing device 170 may be output to the audio output device 185 as an audio signal. In addition, audio signal processed by the signal processing device 170 may be input to the external output apparatus through the external apparatus interface 130.

Although not shown in FIG. 2, the signal processing device 170 may include a demultiplexer, an image processor, and the like. This will be described later with reference to FIG. 3.

In addition, the signal processing device 170 may be configured to control the overall operation of the image display apparatus 100. For example, the signal processing device 170 may be configured to control the tuner 110 to tune in to an RF broadcast corresponding to a channel selected by a user or a prestored channel.

In addition, the signal processing device 170 may be configured to control the image display apparatus 100 according to a user command input through the user input interface 150 or an internal program.

Meanwhile, the signal processing device 170 may be configured to control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include a converter to convert an AC power into a DC voltage, and a DC/DC converter to convert the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
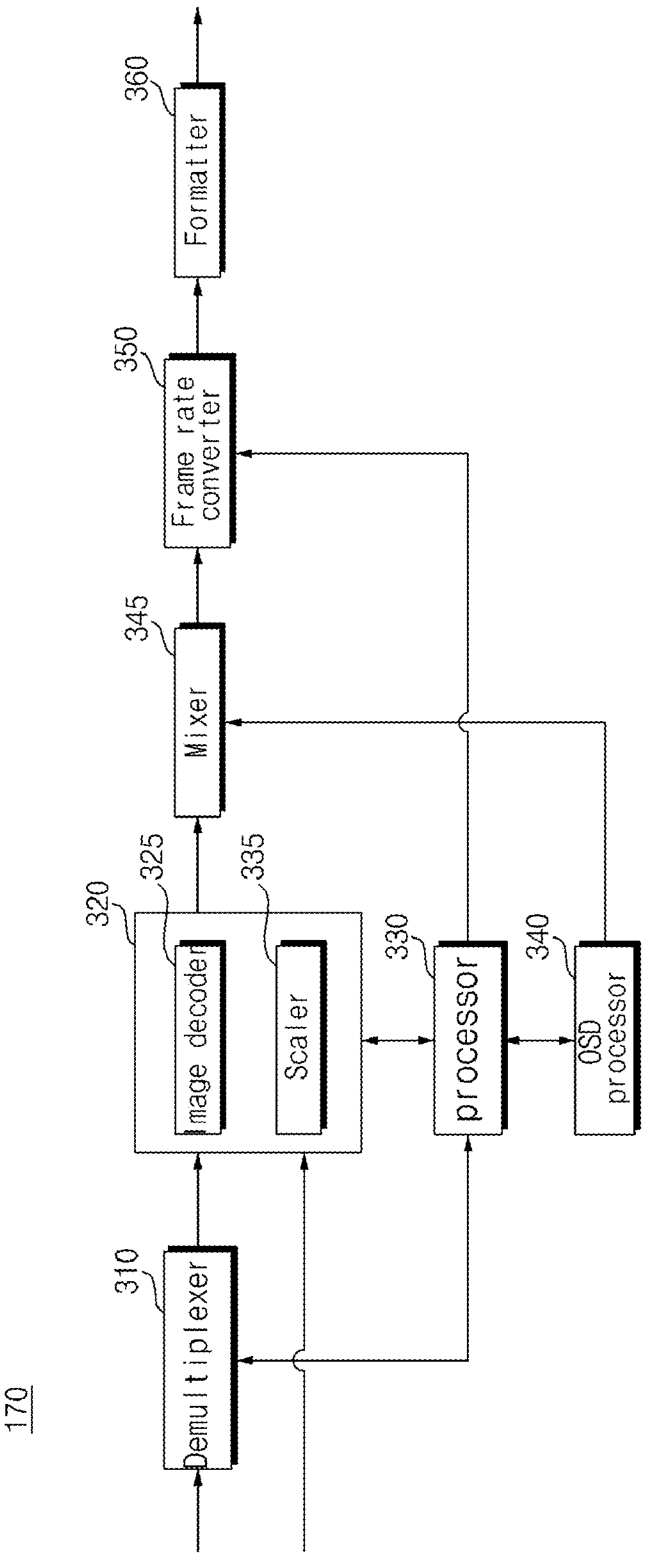
FIG. 3 is an example of an internal block diagram of a signal processing device of FIG. 2.

FIG. 3 is an example of an internal block diagram of the signal processing device of FIG. 2.

Referring to the figure, the signal processing device 170 according to an embodiment of the present disclosure may include a demultiplexer 310, an image processor 320, a processor 330, an OSD processor 340, a mixer 345, a frame rate converter 350, and a formatter 360. In addition, the signal processing device 170 may further include an audio processor (not shown) and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may be configured to perform signal processing on a demultiplexed image signal. To this end, the image processor 320 may have an image decoder 325 and a scaler 335.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The processor 330 may be configured to control the overall operation of the image display apparatus 100 or the signal processing device 170. For example, the processor 330 may be configured to control the tuner 110 to tune in to an RF broadcast corresponding to a channel selected by the user or a prestored channel.

In addition, the processor 330 may be configured to control the image display apparatus 100 according to a user command input through the user input interface 150 or an internal program.

Further, the processor 330 may be configured to control data transmission with the network interface 135 or the external apparatus interface 130.

Moreover, the processor 330 may be configured to control operations of the demultiplexer 310, the image processor 320, the OSD processor 340, and the like in the signal processing device 170.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The mixer 345 may mix an OSD signal generated by the OSD generator 340 with a decoded image signal image-processed by the image processor 320. The mixed image signal may be supplied to the frame rate converter 350.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

Further, the formatter 360 may change the format of an image signal. For example, the formatter 360 may change the format of a 3D image signal into any one of various 3D formats, including a side-by-side format, a top/down format, a frame sequential format, an interlaced format, a checker box format, etc.

Meanwhile, the audio processor (not shown) in the signal processing device 170 may be configured to perform the audio processing of the demultiplexed audio signal. To this end, the audio processor (not shown) may include various decoders.

In addition, the audio processor (not shown) in the signal processing device 170 may process a base, a treble, a volume control, and the like.

The data processor (not shown) in the signal processing device 170 may be configured to perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately or as one module, rather than being provided in the signal processing device 170.

Figure 4A:
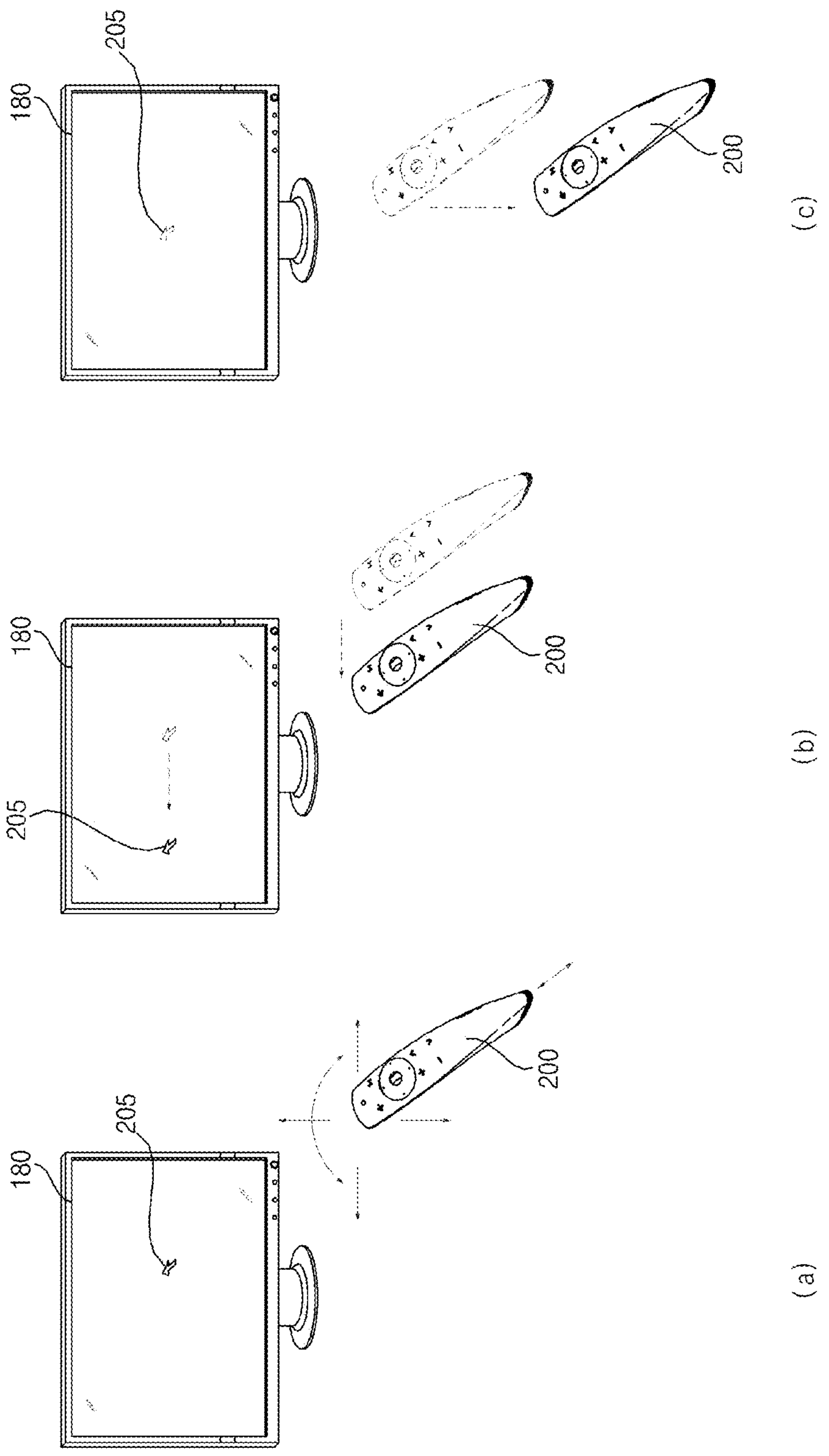
FIG. 4A is a diagram showing a method of controlling a remote controller of FIG. 2.

FIG. 4A is a diagram illustrating a control method of a remote controller of FIG. 2.

As shown in FIG. 4A(*a*), it is illustrated that a pointer 205 corresponding to the remote controller 200 is displayed on the display 180.

The user may move or rotate the remote controller 200 up and down, left and right (FIG. 4A(*b*)), and back and forth (FIG. 4A(*c*)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(*b*) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(*c*) illustrates a case where the user moves the remote controller 200 away from the display 180, while pressing a specific button of the remote controller 200. Accordingly, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
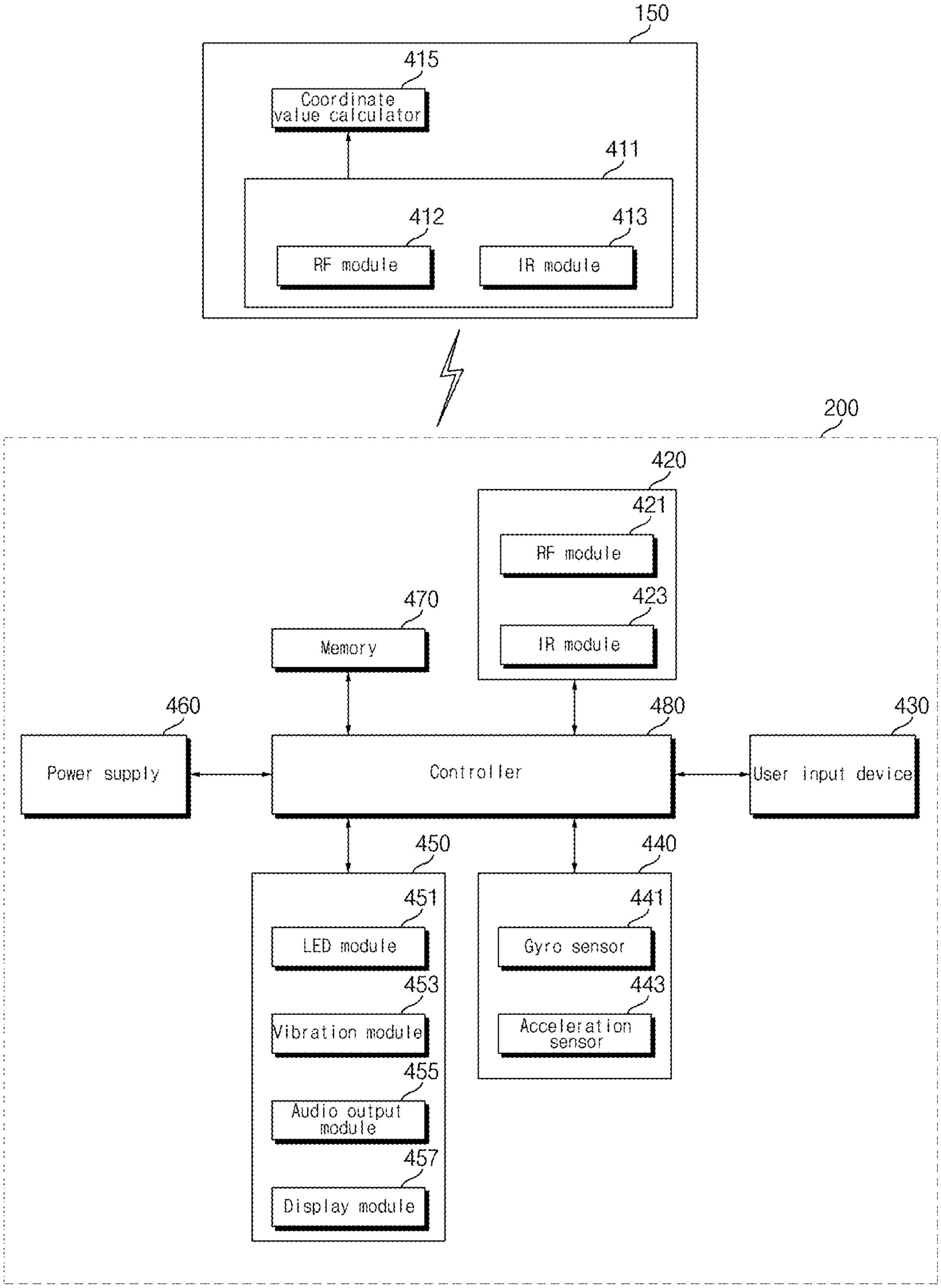
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processing device 170, not in the user input interface 150.

Figure 5:
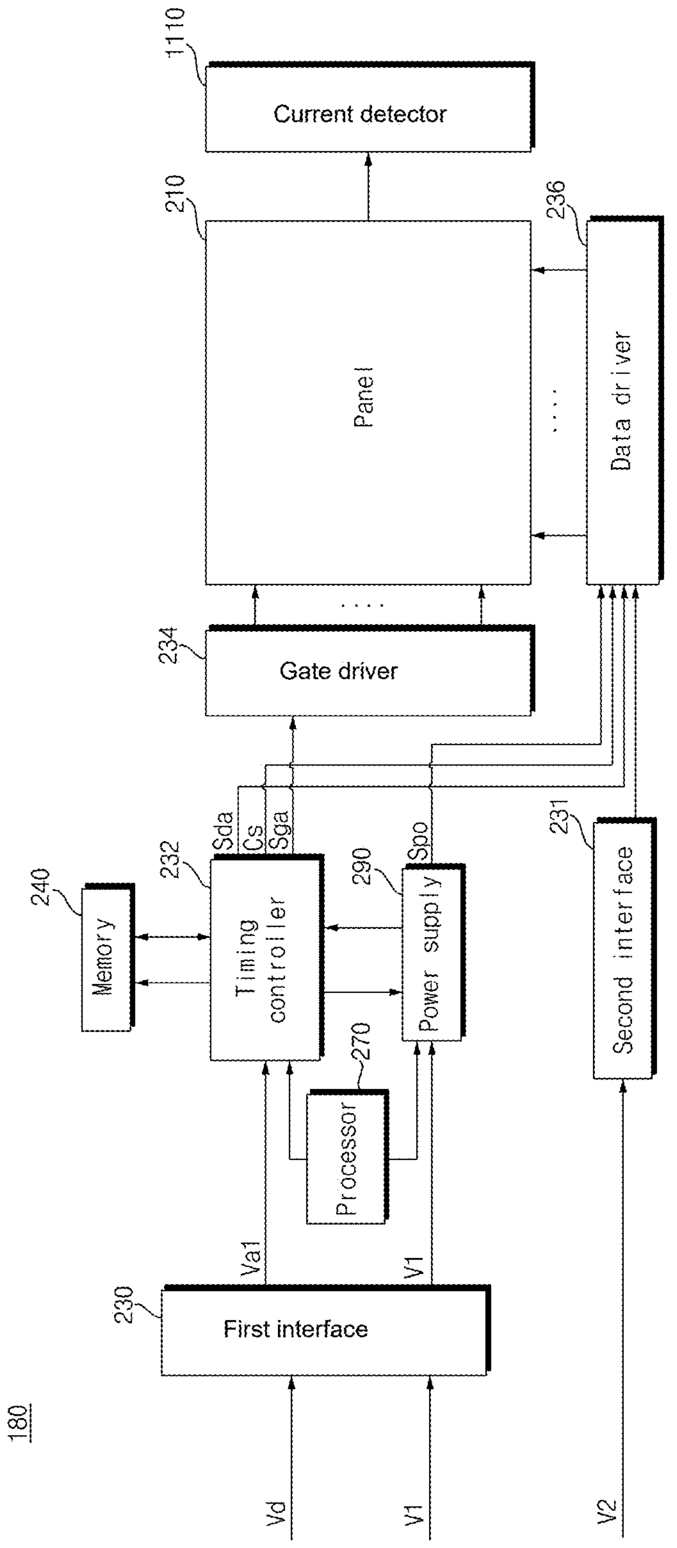
FIG. 5 is an internal block diagram of a display of FIG. 2.

FIG. 5 is an internal block diagram of a display of FIG. 2.

Referring to FIG. 5, the display 180 may include an organic light emitting panel 210, a first interface 230, a second interface 231, a timing controller 232, a gate driver 234, a data driver 236, a memory 240, a processor 270, a power supply 290, a current detector 1110, and the like.

The display 180 receives an image signal Vd, a first DC voltage V1, and a second DC voltage V2, and may display a certain image based on the image signal Vd.

Meanwhile, the first interface 230 in the display 180 may receive the image signal Vd and the first DC voltage V1 from the signal processing device 170.

Here, the first DC voltage V1 may be used for the operation of the power supply 290 and the timing controller 232 in the display 180.

Next, the second interface 231 may receive a second DC voltage V2 from an external power supply 190. Meanwhile, the second DC voltage V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processing device 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting panel 210 through a gate line GL and a data line DL, respectively, according to the gate driving signal Sga and the data driving signal Sda from the timing controller 232. Accordingly, the organic light emitting panel 210 displays a certain image.

Meanwhile, the panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting panel 210 based on a second DC voltage V2 from the second interface 231.

The power supply 290 may supply various power supplies to the gate driver 234, the data driver 236, the timing controller 232, and the like.

The current detector 1110 may detect the current flowing in a sub-pixel of the panel 210. The detected current may be input to the processor 270 or the like, for a cumulative current calculation.

The processor 270 may be configured to perform each type of control of the display 180. For example, the processor 270 may be configured to control the gate driver 234, the data driver 236, the timing controller 232, and the like.

Meanwhile, the processor 270 may receive current information flowing in a sub-pixel of the panel 210 from the current detector 1110.

In addition, the processor 270 may calculate the accumulated current of each subpixel of the organic light emitting panel 210, based on information of current flowing through the subpixel of the organic light emitting panel 210. The calculated accumulated current may be stored in the memory 240.

Meanwhile, the processor 270 may determine as burn-in, if the accumulated current of each sub-pixel of the organic light emitting panel 210 is equal to or greater than an allowable value.

For example, if the accumulated current of each subpixel of the organic light emitting panel 210 is equal to or higher than 300,000 A, the processor 270 may determine that a corresponding subpixel is a burn-in subpixel.

Meanwhile, if the accumulated current of each subpixel of the organic light emitting panel 210 is close to an allowable value, the processor 270 may determine that a corresponding subpixel is a subpixel that is expected to burn in.

Meanwhile, the processor 270 may determine the subpixel having the largest amount of accumulated current as a subpixel that is expected to burn in, based on the current detected by the current detector 1110.

Meanwhile, based on a current detected by the current detector 1110, the processor 270 may calculate a burn-in subpixel or an expected burn-in subpixel of the organic light emitting panel 210, and may be configured to control a current, lower than an allocated current, to flow through subpixels adjacent to the calculated burn-in subpixel or the calculated expected burn-in subpixel. Accordingly, burn-in of sub-pixels adjacent to the burn-in subpixel may be extended. As a result, it is possible to extend the entire service life of the image display apparatus 100 having the organic light emitting panel 210.

Meanwhile, the processor 270 may be configured to control a current, higher than the allocated current, to flow through the calculated burn-in subpixel, such that a low current may flow through the subpixels adjacent to the calculated burn-in subpixel. Accordingly, a phenomenon of decreasing luminance may be prevented.

Meanwhile, if no burn-in occurs in the organic light emitting panel 210, the processor 270 may be configured to control a current, lower than the allocated current, to flow through subpixels adjacent to the expected burn-in subpixel which is expected to burn in. Accordingly, burn-in of sub-pixels adjacent to the expected burn-in subpixel may be extended. As a result, it is possible to extend the entire service life of the image display apparatus 100 having the organic light emitting panel 210.

Meanwhile, the processor 270 may be configured to control a data voltage, lower than an allocated data voltage, to be applied to subpixels adjacent to the calculated burn-in subpixel or the calculated expected burn-in subpixel.

Meanwhile, if no burn-in occurs in the organic light emitting panel 210, the processor 270 may be configured to control a current, lower than the allocated current, to flow through the expected burn-in subpixel as well. Accordingly, burn-in of the expected burn-in subpixel may be extended. As a result, it is possible to extend the entire service life of the image display apparatus 100 having the organic light emitting panel 210.

Meanwhile, the processor 270 may be configured to control a current having a second level, higher than a first level, to flow through a second subpixel located farther away than a first subpixel, among subpixels adjacent to the calculated burn-in subpixel or the calculated expected burn-in subpixel, such that, by controlling a higher current to flow through the second subpixel which is expected to have a longer service life, it is possible to prevent a phenomenon of decreasing luminance.

Meanwhile, the processor 270 may calculate a subpixel, having the largest amount of accumulated current in the organic light emitting panel 210, based on the current detected by the current detector 1110, and may be configured to control a current, lower than the allocated current, to flow through subpixels adjacent to the subpixel having the largest amount of accumulated current. Accordingly, the entire service life of the image display apparatus 100 having the organic light emitting panel 210 may be extended.

Meanwhile, the processor 270 may be configured to control a lower-level current to flow through subpixels located closer to the subpixel having the largest amount of accumulated current. Accordingly, the entire service life of the image display apparatus 100 having the organic light emitting panel 210 may be extended.

Figure 6A:
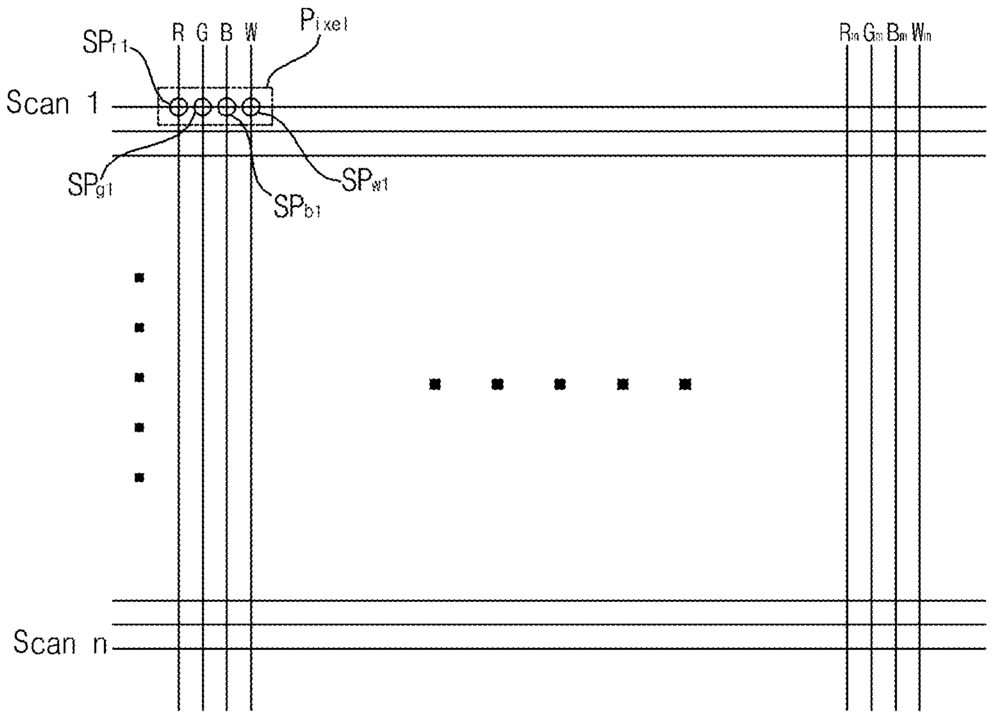
FIGS. 6A and 6B are diagrams referred to in the description of an organic light emitting panel of FIG. 5.
Figure 6B:
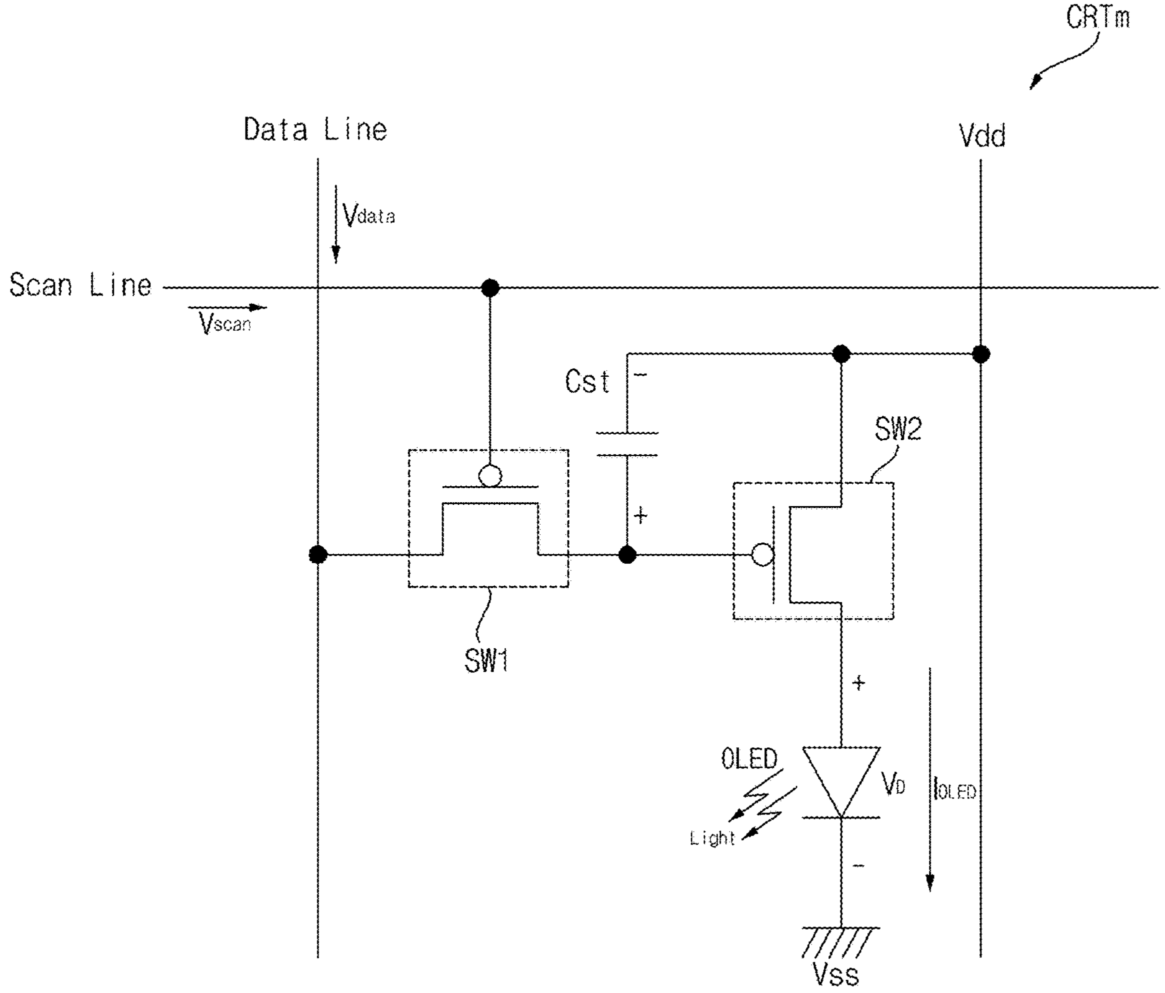

FIGS. 6A and 6B are diagrams referred to in the description of an organic light emitting panel of FIG. 5.

First, FIG. 6A is a diagram illustrating a pixel in the organic light emitting panel 210.

Referring to the figure, the organic light emitting panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting panel 210. In the figure, a pixel including subpixels SR1, SG1, SB1, and SW1 of RGBW is shown.

FIG. 6B illustrates a circuit of any one sub-pixel in the pixel of the organic light emitting panel of FIG. 6A.

Referring to the figure, an organic light emitting sub pixel circuit CRT may include, as an active type, a switching transistor SW1, a storage capacitor Cst, a drive transistor SW2, and an organic light emitting layer OLED.

The switching transistor SW1 is turned on according to the input scan signal Vdscan, as a scan line is connected to a gate terminal. When it is turned on, the input data signal Vdata is transferred to the gate terminal of a drive transistor SW2 or one end of the storage capacitor Cst.

The storage capacitor Cst is formed between the gate terminal and the source terminal of the drive transistor SW2, and stores a certain difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a pulse width modulation (PWM) method, the power level stored in the storage capacitor Cst varies according to the pulse width difference of the data signal Vdata.

The drive transistor SW2 is turned on according to the power level stored in the storage capacitor Cst. When the drive transistor SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the figure, it is illustrated that a p-type MOSFET is used for a switching transistor SW1 and a drive transistor SW2, but an n-type MOSFET or other switching element, such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, subpixels emit light as a current flows to the organic light emitting layer OLED in the respective subpixels illustrated in FIG. 6B.

Figure 7A:
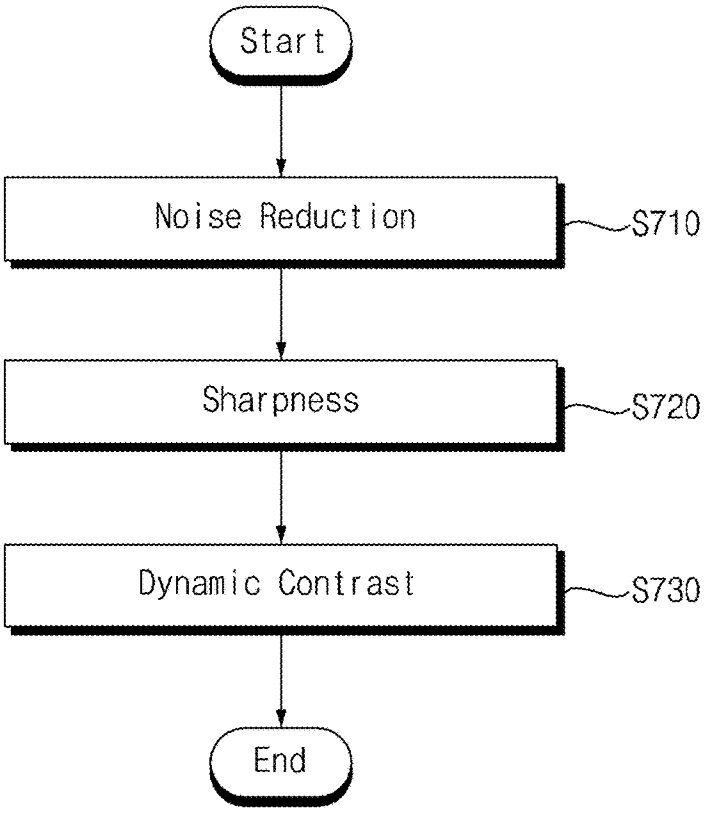
FIG. 7A is a flowchart illustrating an example of a method of operating an image display apparatus related to the present disclosure.

FIG. 7A is a flowchart illustrating an example of a method of operating an image display apparatus related to the present disclosure.

Referring to the figure, the signal processing device 170 in the image display apparatus 100 related to the present disclosure may be configured to perform noise reduction on an image signal (S710).

For example, the signal processing device 170 may be configured to perform noise removal in multiple stages, in order to reduce noise in an image signal.

Next, the signal processing device 170 may be configured to perform sharpness processing of the image signal (S720).

For example, the signal processing device 170 may be configured to perform sharpness processing by detecting an edge element from a noise-reduced image signal and increasing the sharpness gain of the edge element.

Next, the signal processing device 170 may be configured to perform dynamic contrast processing (S730).

For example, the signal processing device 170 may be configured to perform dynamic contrast processing on the sharpness-processed image signal, by using contrast gain.

Figure 7B:
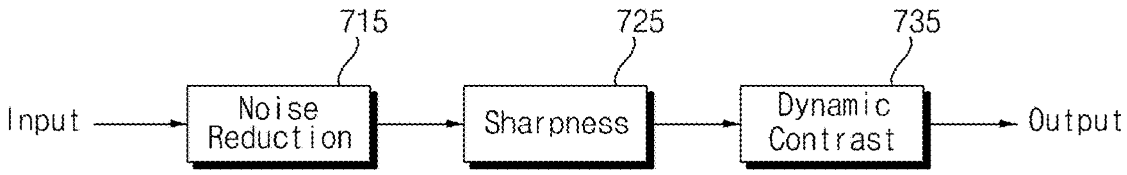
FIG. 7B is a view referred to in describing FIG. 7A.

FIG. 7B shows an exemplary internal block diagram of a signal processing device related to the present disclosure.

Referring to the drawing, the signal processing device 170 related to the present disclosure may include a noise reducer 715, a sharpness processor 725, and a dynamic contrast processor 735.

The noise reducer 715 may be configured to perform noise reduction on an image signal, as shown in the step S710 of FIG. 7A.

Next, the sharpness processor 725 may be configured to perform sharpness processing by detecting an edge element from the noise-reduced image signal and increasing the sharpness gain of the edge element, as in the step S720 of FIG. 7A.

Next, the dynamic contrast processor 735 may be configured to perform dynamic contrast processing on the sharpness-processed image signal by using contrast gain, as in the step S730 of FIG. 7A.

Meanwhile, as shown in FIGS. 7A and 7B, in the processing of an image signal, performing contrast processing after sharpness processing may lead to problems such as amplification of noise in the image signal. In particular, the noise amplification appears prominently in a low gray level area of the image signal.

Meanwhile, as shown in FIGS. 7A and 7B, in the processing of an image signal, performing contrast processing after sharpness processing may lead to a decrease in sharpness in a high gray level area of the image signal.

In view of this, the present disclosure proposes a method for solving this problem. This will be described with reference to FIG. 9 and the subsequent drawings.

Figure 8:
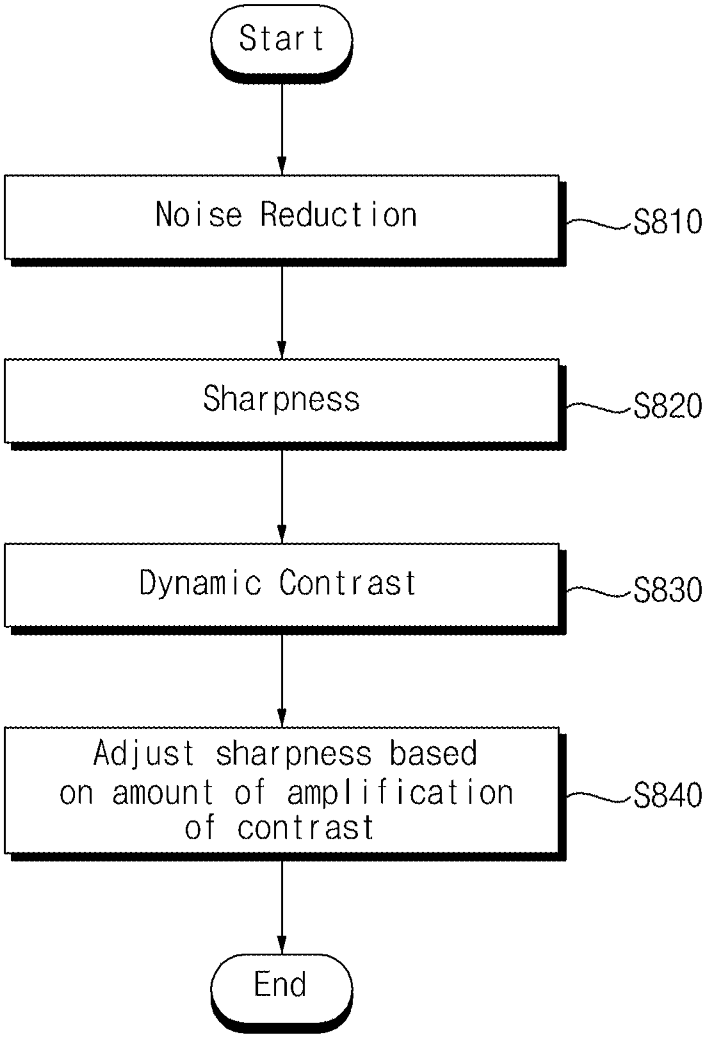
FIG. 8 is a flowchart illustrating an example of a method of operating an image display apparatus according to an embodiment of the present disclosure.

FIG. 8 is a flowchart illustrating an example of a method of operating an image display apparatus according to an embodiment of the present disclosure.

Referring to the drawing, the signal processing device 170 in the image display apparatus 100 according to an embodiment of the present disclosure may be configured to perform noise reduction on an image signal (S810).

For example, the signal processing device 170 may be configured to perform noise removal in multiple stages, in order to reduce noise in an image signal.

Specifically, the signal processing device 170 may be configured to perform temporal processing and spatial processing in a noise removal process for an image signal.

Meanwhile, the signal processing device 170 may remove noise in original data of an input image signal or remove noise between frames of an image signal, in order to reduce noise in the image signal.

Next, the signal processing device 170 may be configured to perform sharpness processing of the image signal (S820).

For example, the signal processing device 170 may be configured to perform sharpness processing by detecting an edge element from a noise-reduced image signal and increasing the sharpness gain of the edge element.

Next, the signal processing device 170 may be configured to perform dynamic contrast processing (S830).

Meanwhile, the signal processing device 170 may be configured to perform dynamic contrast processing on the sharpness-processed image signal, by using contrast gain.

For example, while processing the dynamic contrast, the signal processing device 170 may be configured to change the color spectrum of the image signal based on contrast gain. Accordingly, noise amplification can be reduced, or sharpness can be improved.

Specifically, while processing the dynamic contrast, the signal processing device 170 may be configured to increase the color spectrum of the image signal as contrast gain increases, and decrease the color spectrum of the image signal as the contrast gain decreases. Accordingly, dynamic contrast processing can be efficiently performed.

Next, the signal processing device 170 adjusts the sharpness of the dynamic contrast-processed image signal, based on the amount or slope of amplification of contrast by the dynamic contrast processing (S840).

For example, the signal processing device 170 may be configured to decrease the strength of the sharpness while adjusting the sharpness, in response to an increase of the amount or slope of amplification of contrast by the dynamic contrast processing. Accordingly, noise amplification can be reduced, or sharpness can be improved.

Meanwhile, in response to the amount or slope of amplification of contrast by the dynamic contrast processing exceeding a predetermined value, the signal processing device 170 may be configured to decrease the strength of the sharpness while adjusting the sharpness. Accordingly, noise amplification can be reduced, or sharpness can be improved. In particular, noise amplification in a low gray level area can be reduced, or sharpness in a high gray level area can be improved.

Meanwhile, while adjusting the sharpness, the signal processing device 170 may be configured to decrease the strength of the sharpness as the amount of slope of amplification increases, in a state in which the amount or slope of amplification of contrast by the dynamic contrast processing exceeds a predetermined value. Accordingly, noise amplification can be reduced, or sharpness can be improved.

Meanwhile, the signal processing device 170 may be configured to increase the strength of the sharpness while adjusting the sharpness, if the amount or slope of amplification of contrast by the dynamic contrast processing decreases. Accordingly, noise amplification can be reduced, or sharpness can be improved.

Meanwhile, while adjusting the sharpness, the signal processing device 170 may be configured to increase the strength of the sharpness as the amount or slope of amplification decreases, in a state in which the amount or slope of amplification of contrast by the dynamic contrast processing is below a predetermined value. Accordingly, noise amplification can be reduced, or sharpness can be improved.

Alternatively, if the amount or slope of amplification of contrast by the dynamic contrast processing being below a predetermined value, the signal processing device 170 may not perform sharpness adjustment. Accordingly, sharpness adjustment can be efficiently performed.

FIGS. 9 to 14B are views referred to in describing the operation method of FIG. 8.

Figure 9:
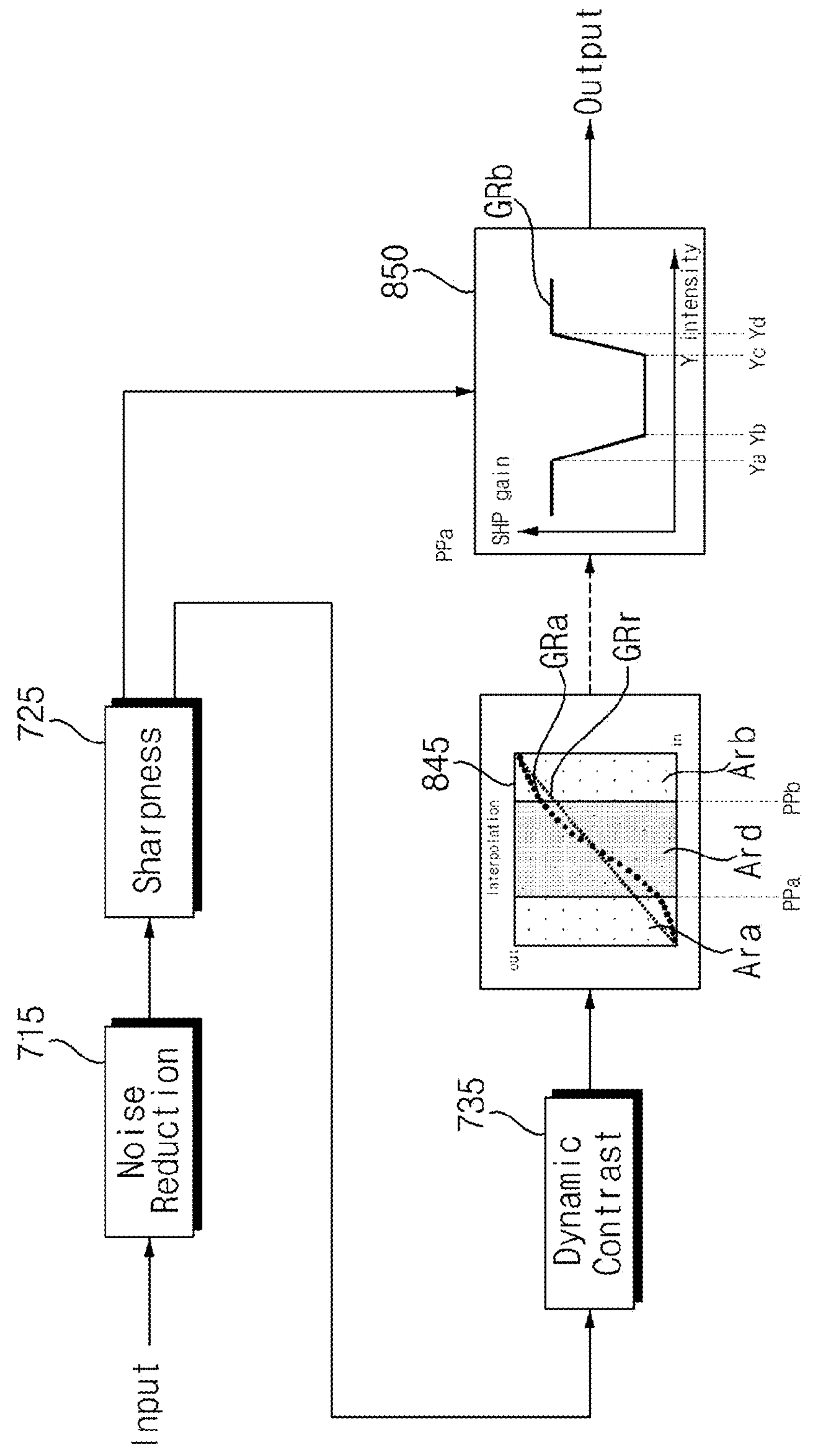
FIGS. 9 to 14B are views referred to in describing the operation method of FIG. 8.

First, FIG. 9 is an exemplary internal block diagram of a signal processing device according to an embodiment of the present disclosure.

Referring to the drawing, the signal processing device 170 may include a noise reducer 715, a sharpness processor 725, a dynamic contrast processor 735, and a sharpness adjuster 850.

The noise reducer 715 may be configured to perform noise reduction on an image signal, as in the step S810 of FIG. 8.

Next, the sharpness processor 725 may be configured to perform sharpness processing on the noise-reduced image signal, as in the step S820 of FIG. 8.

For example, the sharpness processor 725 may be configured to perform sharpness processing by detecting an edge element from the noise-reduced image signal and increasing the sharpness gain of the edge element.

Meanwhile, the sharpness processor 725 may be configured to perform sharpness processing based on the average picture level (APL) of the image signal.

For example, the sharpness processor 725 may increase sharpness processing or sharpness gain as the average picture level (APL) of the image signal becomes lower.

Meanwhile, the sharpness processor 725 may increase sharpness processing or sharpness gain further in a low gray level area of the image signal than in a high gray level area of the image signal.

Meanwhile, the sharpness processor 725 may increase sharpness processing, sharpness gain, or range of sharpness processing, further in a low gray level image frame than in a high gray level image frame.

Meanwhile, the sharpness processor 725 may adjust strength of the sharpness or sharpness gain based on a set input from the remote controller 200.

For example, if one of a plurality of levels is selected while a sharpness setting screen is shown on the display 180, the sharpness processor 725 may set strength of the sharpness or sharpness gain based on the selected level.

Next, the dynamic contrast processor 735 may be configured to perform dynamic contrast processing on the sharpness-processed image signal, as in the step S830 of FIG. 8.

For example, while processing the dynamic contrast, the dynamic contrast processor 735 may be configured to change the color spectrum of the image signal based on contrast gain. Accordingly, noise amplification can be reduced, or sharpness can be improved.

Specifically, while processing the dynamic contrast, the dynamic contrast processor 735 may be configured to increase the color spectrum of the image signal as contrast gain increases, and decrease the color spectrum of the image signal as the contrast gain decreases. Accordingly, dynamic contrast processing can be efficiently performed.

Meanwhile, the dynamic contrast processor 735 may change the range of dynamic contrast processing depending on the range of sharpness processing by the sharpness processor 725.

In the drawing, a dynamic contrast processing result 845 is illustrated which includes a contrast conversion graph GRa corresponding to an output luminance vs. input luminance and a reference graph GRr.

The gradient of the reference graph GRr may be, but not limited to, a predetermined value, for example, '1' and may change in value.

Meanwhile, the amount or slope of amplification of contrast by the dynamic contrast processing may be represented by an "S" shape as shown in the contrast conversion graph GRa.

Meanwhile, according to the contrast conversion graph GRa, if the input luminance is lower than PPa, the amount or slope of amplification of contrast may be below a predetermined value, if the input luminance is PPa, the amount or slope of amplification of contrast may be equal to the predetermined value, if the input luminance is between PPa and PPb, the amount or slope of amplification of contrast may be larger than the predetermined value, if the input luminance is PPb, the amount or slope of amplification of contrast may be equal to the predetermined value, and if the input luminance exceeds PPb, the amount or slope of amplification of contrast may be below the predetermined value.

Accordingly, the contrast conversion graph GRa may be divided into a first section Ara where the amount or slope of amplification of contrast by the dynamic contrast processing is below the predetermined value, a second section Ard where the amount or slope of amplification of contrast by the dynamic contrast processing is larger than the predetermined value, and a third section Arb where the amount or slope of amplification of contrast by the dynamic contrast processing is smaller than the predetermined value.

In this case, the first area Ara and the second area Ard may be a low gray level area, and the third area Arb may be a mid gray level area or a high gray level area.

Meanwhile, in the second section Ard of the low gray level area, the amount or slope of amplification of contrast by the dynamic contrast processing exceeds the predetermined value, and therefore dynamic contrast processing may result in an unintentional amplification of noise in an image signal.

In view of this, in the present disclosure, the sharpness adjuster 850 or the like performs sharpness adjustment after dynamic contrast processing.

Next, the sharpness adjuster 850 adjusts the sharpness of the dynamic contrast-processed image signal based on the amount or slope of amplification of contrast by the dynamic contrast processing, as in the step S840 of FIG. 8.

For example, in response to the amount or slope of amplification of contrast by the dynamic contrast processing exceeding the predetermined value, the sharpness adjuster 850 may be configured to decrease the strength of the sharpness while adjusting sharpness.

Specifically, the sharpness adjuster 850 may be configured to decrease the strength of the sharpness while adjusting sharpness, with respect to the second section Ard where the amount or slope of amplification of contrast by the dynamic contrast processing is larger than the predetermined value.

Thus, it is possible to reduce noise amplification in the second section Ard where noise is unintentionally amplified. In particular, noise amplification in a low gray level area can be reduced.

Meanwhile, in a state in which the amount or slope of amplification of contrast by the dynamic contrast processing exceeds a predetermined value, the sharpness adjuster 850 may be configured to decrease the strength of the sharpness as the amount of slope of amplification increases, while adjusting the sharpness. Accordingly, noise amplification can be reduced, or sharpness can be improved.

Meanwhile, the sharpness adjuster 850 may be configured to control the strength of the sharpness to be increased while adjusting the sharpness, if the amount or slope of amplification of contrast by the dynamic contrast processing decreases. Accordingly, noise amplification can be reduced, or sharpness can be improved.

Meanwhile, in a state in which the amount or slope of amplification of contrast by the dynamic contrast processing is below a predetermined value, the sharpness adjuster 850 may be configured to increase the strength of the sharpness as the amount or slope of amplification decreases, while adjusting the sharpness. Accordingly, noise amplification can be reduced, or sharpness can be improved.

Alternatively, if the amount or slope of amplification of contrast by the dynamic contrast processing being below a predetermined value, the sharpness adjuster 850 may not perform sharpness adjustment. Accordingly, sharpness adjustment can be efficiently performed.

In the drawing, a contrast conversion graph GRb corresponding to a sharpness gain vs. input luminance and a sharpness adjustment result 850 including a sharpness gain graph GRb are illustrated.

Meanwhile, in response to the amount or slope of amplification of contrast by the dynamic contrast processing being below a predetermined value, the sharpness adjuster 850 in the signal processing device 170 may be configured to control the strength of the sharpness to be at a first level while adjusting the sharpness, as shown in the sharpness adjustment result 850, and in response to the amount or slope of amplification of contrast by the dynamic contrast processing exceeding the predetermined value, it may be configured to control the strength of the sharpness to be at a second level lower than the first level, while adjusting the sharpness.

Thus, noise amplification can be reduced, or sharpness can be improved. In particular, noise amplification in a low gray level area can be reduced, or sharpness in a high gray level area can be improved.

Meanwhile, the signal processing device 170 may be configured to gradually change the strength of the sharpness from the first level to the second level or from the second level to the first level, while adjusting the sharpness. Thus, noise amplification can be reduced, or sharpness can be improved.

For example, if the luminance is between Ya and Yb, the signal processing device 170 may be configured to control the strength of the sharpness or the sharpness gain to gradually change between the first level and the second level, while adjusting the sharpness.

For another example, if the luminance is between Yc and Yd, the signal processing device 170 may be configured to control the strength of the sharpness or the sharpness gain to gradually change between the second level and the first level, while adjusting the sharpness.

Figure 10A:
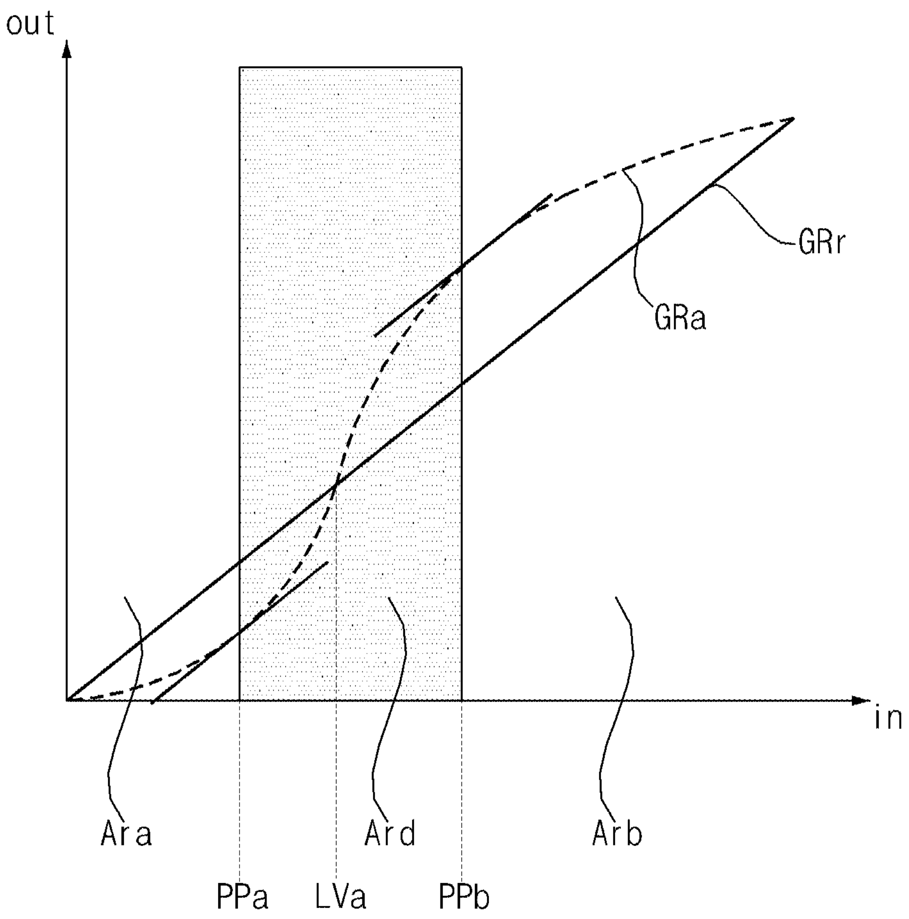

FIG. 10A is an enlarged view of a dynamic contrast processing result 850 including a contrast conversion graph GRa corresponding to an output luminance vs. input luminance and a reference graph GRr.

Referring to the drawing, the amount or slope of amplification of contrast by the dynamic contrast processing may be represented by an "S" shape as shown in the contrast conversion graph GRa.

Meanwhile, according to the contrast conversion graph GRa, if the input luminance is lower than PPa, the amount or slope of amplification of contrast may be below a predetermined value, if the input luminance is PPa, the amount or slope of amplification of contrast may be equal to the predetermined value, if the input luminance is between PPa and PPb, the amount or slope of amplification of contrast may be larger than the predetermined value, if the input luminance is PPb, the amount or slope of amplification of contrast may be equal to the predetermined value, and if the input luminance exceeds PPb, the amount or slope of amplification of contrast may be below the predetermined value.

Meanwhile, according to the contrast conversion graph GRa, if the input gray level of the image signal is a first gray level LVa, the contrast conversion graph GRa and the reference graph GRr have the same output luminance.

Meanwhile, while processing the dynamic contrast, in response to the gray level of the image signal being below the first gray level LVa, the dynamic contrast processor 735 in the signal processing device 170 may be configured to control the output luminance to be lower than the input luminance, and in response to the gray level of the image signal exceeding the first gray level LVa, it may be configured to control the output luminance to be higher than the input luminance.

Meanwhile, the sharpness adjuster 850 in the signal processing device 170 may be configured decrease noise amplification or increase the sharpness based on the amount of amplification of contrast by the dynamic contrast processing. Accordingly, noise amplification can be reduced, or sharpness can be improved.

Meanwhile, the sharpness adjuster 850 in the signal processing device 170 may be configured to adjust the sharpness of the image signal more in sports mode than in movie mode. Accordingly, in sports mode, noise amplification can be further reduced, or sharpness can be further improved.

Meanwhile, in response to the gray level of the image signal being below the first gray level LVa, the sharpness adjuster 850 in the signal processing device 170 may be configured to decrease noise amplification, and in response to the gray level of the image signal exceeding the first gray level LVa, it may be configured to such that the sharpness is increased. In particular, noise amplification in a low gray level area can be reduced, or sharpness in a high gray level area can be improved.

Figure 10B:
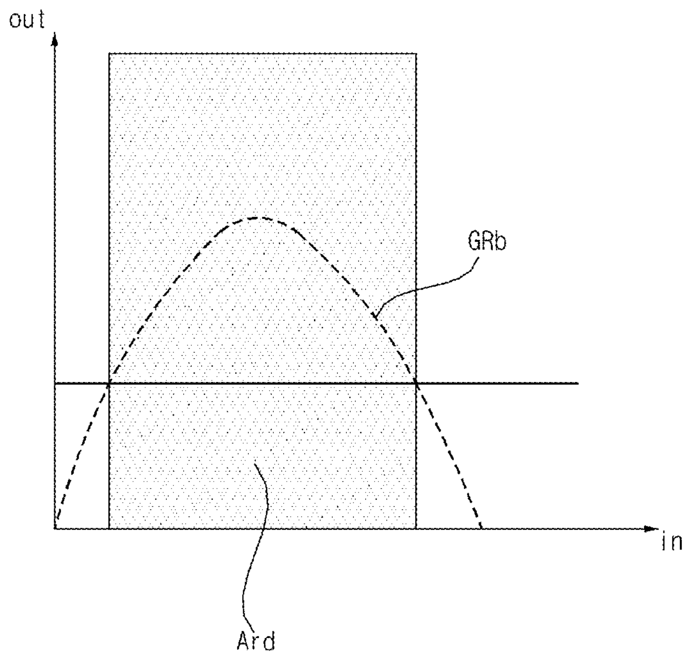

Meanwhile, the sharpness adjuster 850 in the signal processing device 170 may compute or extract the amount or slope of amplification of contrast by the dynamic contrast processing in the contrast conversion graph GRa of FIG. 10A, as shown in FIG. 10B.

For example, the sharpness adjuster 850 in the signal processing device 170 may compute or extract an amplification amount graph GRb representing the amount or slope of amplification of contrast by the dynamic contrast processing, as shown in FIG. 10B, by calculating the instantaneous slope in the contrast conversion graph GRa of FIG. 10A.

Figure 10C:
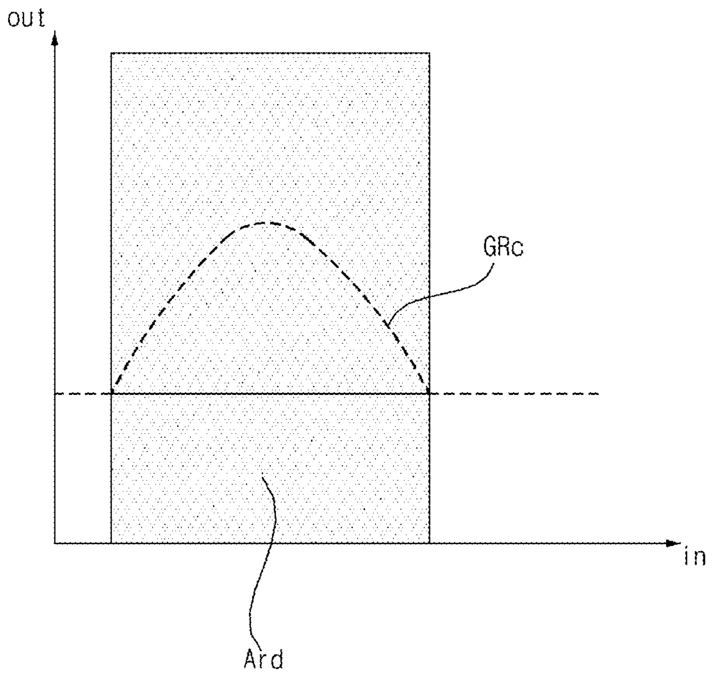

Next, if the amount or slope of amplification of contrast in the amplification amount graph GRb is below a predetermined value, the sharpness adjuster 850 in the signal processing device 170 may compute or extract a graph GRc only including the second section Ard where the amount or slope of amplification of contrast by the dynamic contrast processing exceeds the predetermined value by clipping, as shown in FIG. 10C.

Figure 10D:
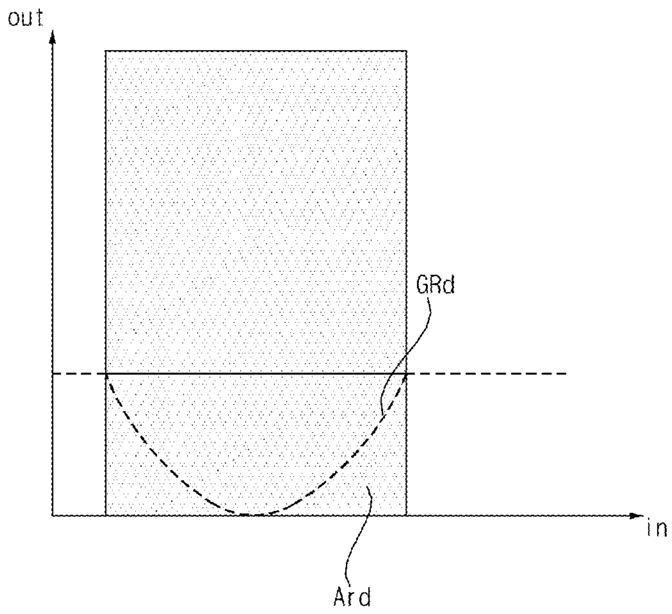

Next, the sharpness adjuster 850 in the signal processing device 170 may compute or extract the reciprocal graph GRd, as shown in FIG. 10D, by performing reciprocal processing on the graph GRc only including the second section Ard.

Figure 10E:
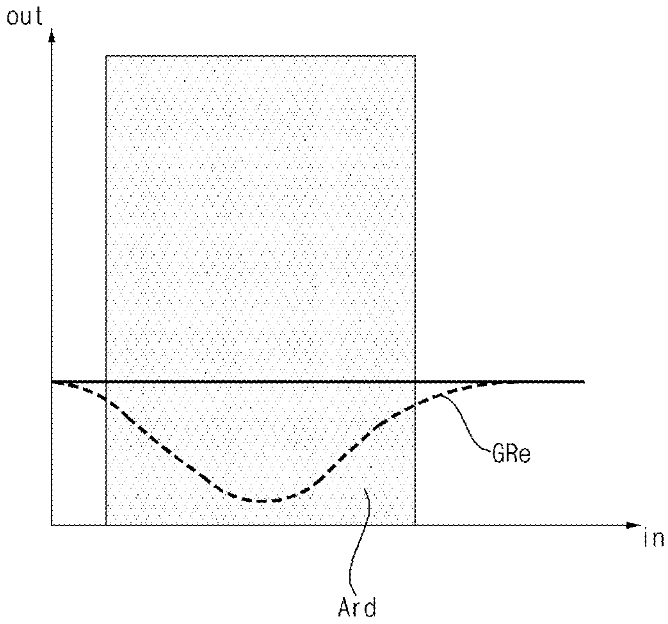

Next, the sharpness adjuster 850 in the signal processing device 170 may compute or extract a filtered graph GRe, as shown in FIG. 10E, by performing filtering on the reciprocal graph GRd.

Figure 10F:
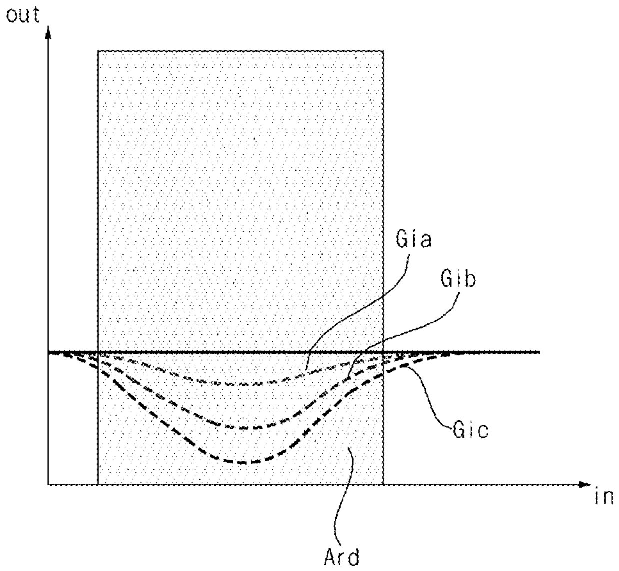

Next, the sharpness adjuster 850 in the signal processing device 170 may compute or calculate a plurality of gain graphs Gia, Gib, and Gic, as shown in FIG. 10F, by performing gain adjustment according to a set input.

For example, the sharpness adjuster 850 in the signal processing device 170 may compute or extract a first gain graph Gia by performing first gain adjustment according to a set input of a first level from the remote controller 200 or the like, compute or extract a second gain graph Gib by performing second gain adjustment according to a set input of a second level which is higher than the first level, and compute or extract a third gain graph Gic by performing third gain adjustment according to a set input of a third level which is higher than the second level.

That is, the sharpness adjuster 850 in the signal processing device 170 may be configured to decrease the strength of the sharpness as the level set for sharpness adjustment from the remote controller 200 or the like increases, while adjusting the sharpness.

Figure 10G:
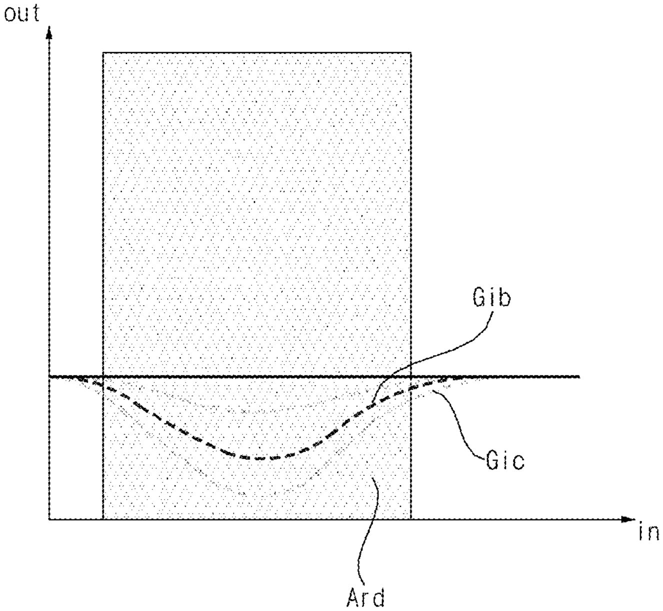

Next, the sharpness adjuster 850 in the signal processing device 170 may be configured to perform sharpness adjustment by using the corresponding gain graph Gib, as shown in FIG. 10G, according to a set input from the remote controller 200 or the like, by performing gain adjustment according to a set input.

Figure 11A:
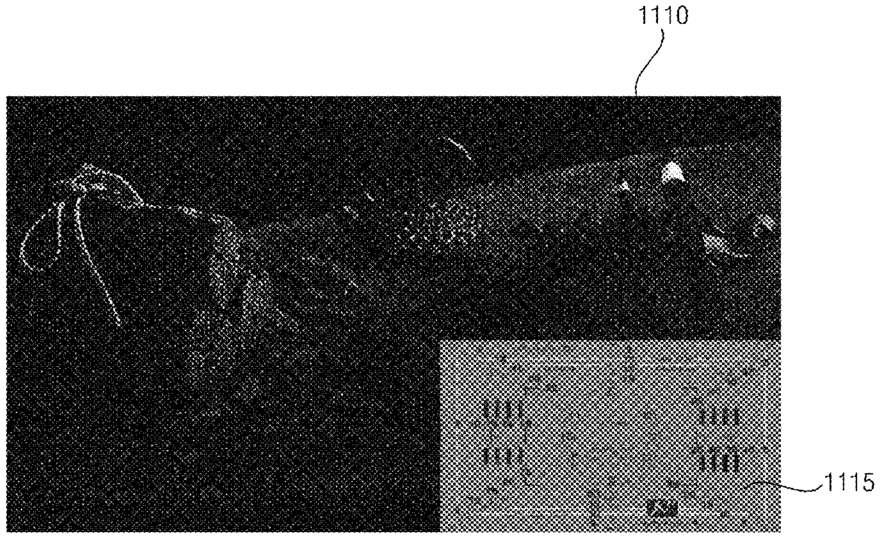
Figure 11B:
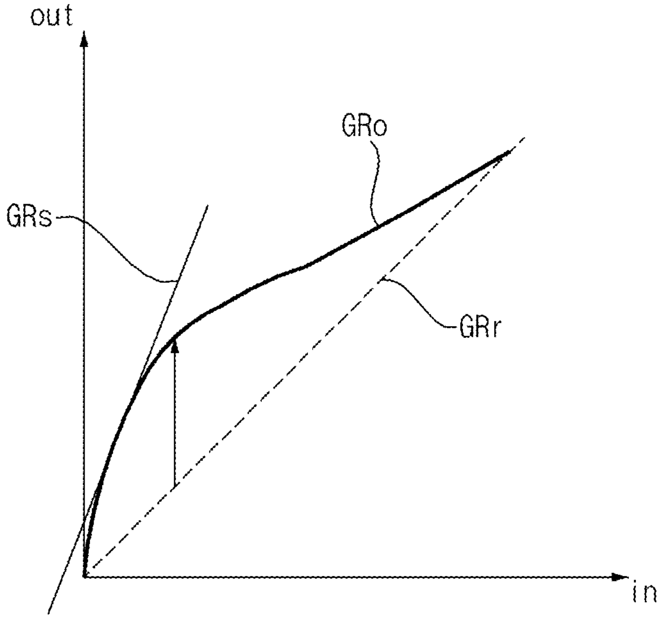

FIG. 11A illustrates an example of a low-gray level image, and FIG. 11B illustrates dynamic contrast processing corresponding to the low-gray level image of FIG. 11A.

Referring to the drawings, upon receiving a low-gray level image 1110, the signal processing device 170 may be configured to perform dynamic contrast processing for low gray level amplification, as shown in FIG. 11B.

That is, the signal processing device 170 may be configured to further perform low gray level amplification based on a contrast conversion graph GRo corresponding to the low-gray level image 1110, in contrast with the reference graph GRr.

Figure 12A:
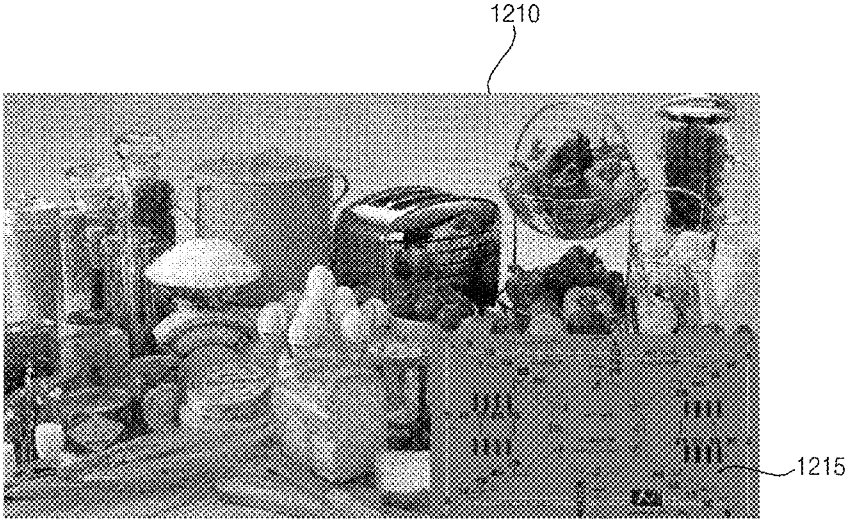
Figure 12B:
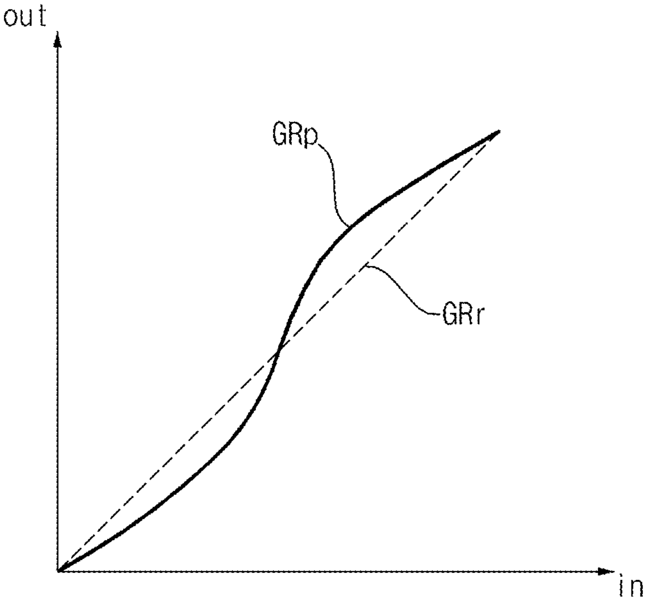

FIG. 12A illustrates an example of an image whose luminance is higher than in FIG. 11A, and FIG. 12B illustrates dynamic contrast processing corresponding to the image of FIG. 12A.

Referring to the drawings, upon receiving an image 1210 having higher luminance than the low-gray level image 1110 of FIG. 11A, the signal processing device 170 may be configured to perform dynamic contrast processing, as shown in FIG. 12B.

That is, the signal processing device 170 may be configured to perform dynamic contrast processing based on a contrast conversion graph GRp corresponding to the image 1210.

Figure 13A:
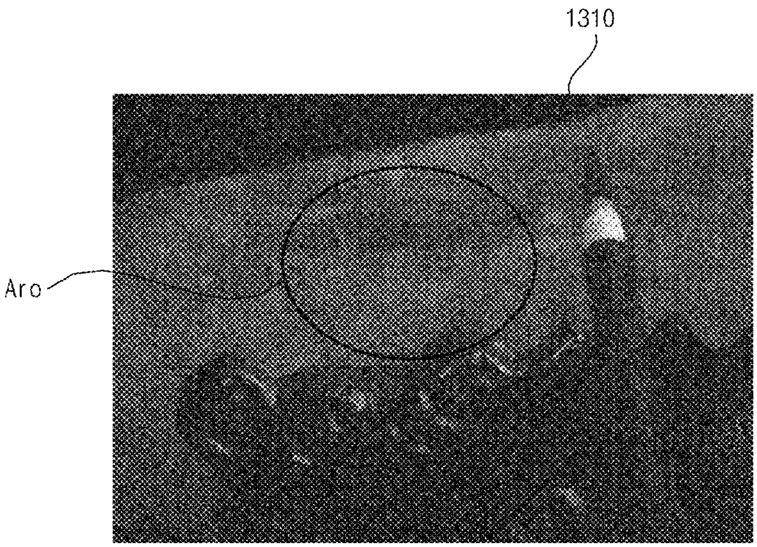

FIG. 13A illustrates an image 1310 obtained after dynamic contrast processing is performed on the low-gray level image of FIG. 11A.

Referring to the drawing, an amplified noise component appears in a low gray level area Aro in the low-gray level image 1310.

Figure 13B:
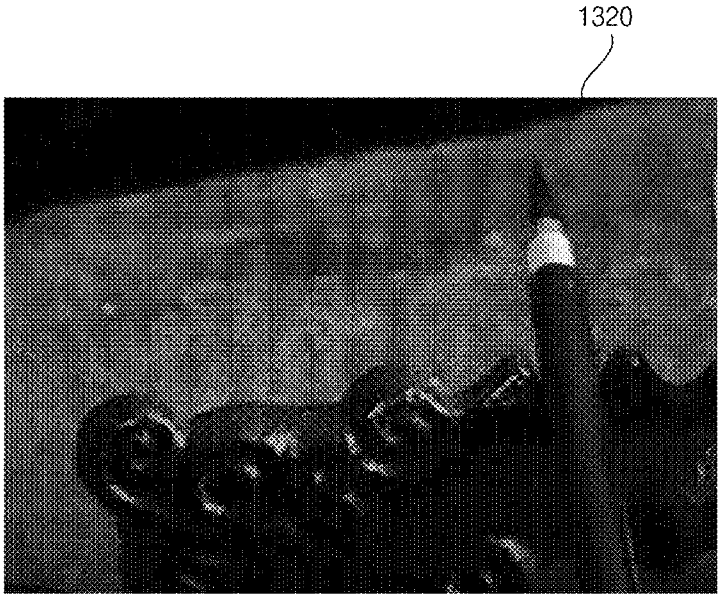

FIG. 13B illustrates an image 1320 obtained by performing the sharpness adjustment of FIG. 8 or FIG. 9 on the low-gray level image of FIG. 11A after dynamic contrast processing.

Referring to the drawing, the noise component is reduced in a low gray level area in the low-gray level image 1320.

Particularly, a sharp image may be displayed due to the reduction of the noise component, compared to FIG. 13A.

Figure 14A:
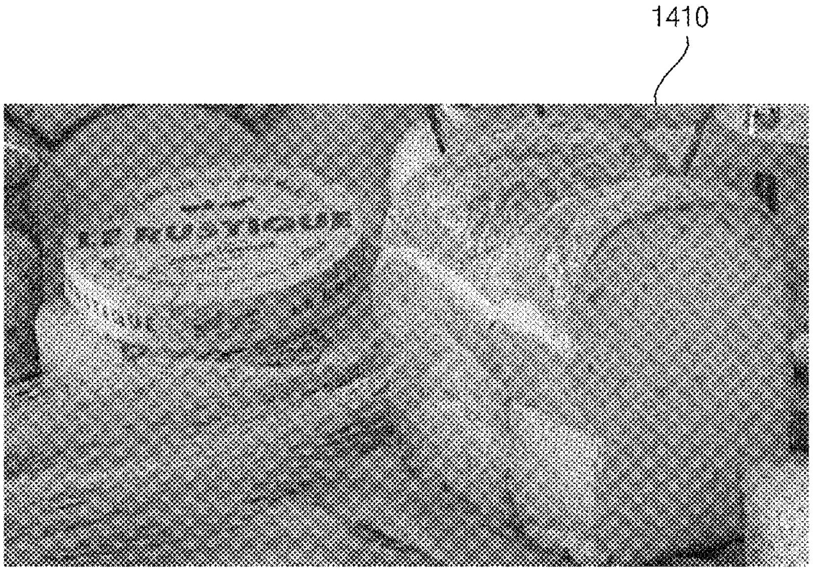

FIG. 14A illustrates an image 1410 obtained after dynamic contrast processing is performed on a predetermined image having higher luminance than the low-gray level image.

Referring to the drawing, a left area in the predetermined image 1410 shows low sharpness.

Figure 14B:

FIG. 14B illustrates an image 1420 obtained by performing the sharpness adjustment of FIG. 8 or FIG. 9 on the predetermined image after dynamic contrast processing.

Referring to the drawing, a left area Arp in the image 1420 has increased sharpness.

Particularly, the image may be displayed with considerably increased sharpness, compared to FIG. 14A.

As described above, an image display apparatus according to an embodiment of the present disclosure comprise: a display; and a signal processing device to output an image signal to the display, wherein the signal processing device is configured to perform dynamic contrast processing after performing sharpness processing of the image signal, and adjust the sharpness of the image signal based on the amount or slope of amplification of contrast by the dynamic contrast processing. Accordingly, noise amplification can be reduced, or sharpness can be improved. In particular, noise amplification in a low gray level area can be reduced, or sharpness in a high gray level area can be improved.

Meanwhile, in response to an increase of the amount or slope of amplification of contrast by the dynamic contrast processing, the signal processing device may be configured to decrease the strength of the sharpness while adjusting the sharpness. Accordingly, noise amplification can be reduced, or sharpness can be improved.

Meanwhile, in response to the amount or slope of amplification of contrast by the dynamic contrast processing exceeding a predetermined value, the signal processing device may be configured to decrease the strength of the sharpness while adjusting the sharpness. Accordingly, noise amplification can be reduced, or sharpness can be improved.

Meanwhile, while adjusting the sharpness, the signal processing device may be configured to decrease the strength of the sharpness as the amount of slope of amplification increases, in a state in which the amount or slope of amplification of contrast by the dynamic contrast processing exceeds a predetermined value. Accordingly, noise amplification can be reduced, or sharpness can be improved.

Meanwhile, in response to the amount or slope of amplification of contrast by the dynamic contrast processing being below the predetermined value, the signal processing device may not adjust the sharpness. Accordingly, sharpness adjustment can be effectively performed.

Meanwhile, the signal processing device may be configured to increase the strength of the sharpness as the amount or slope of amplification of contrast by the dynamic contrast processing decreases, while adjusting the sharpness. Accordingly, noise amplification can be reduced, or sharpness can be improved.

Meanwhile, while adjusting the sharpness, the signal processing device may be configured to increase the strength of the sharpness as the amount or slope of amplification decreases, in a state in which the amount or slope of amplification of contrast by the dynamic contrast processing is below a predetermined value. Accordingly, noise amplification can be reduced, or sharpness can be improved.

Meanwhile, the signal processing device may be configured to perform noise reduction before the sharpness processing. Accordingly, noise can be reduced.

Meanwhile, in response to the amount or slope of amplification of contrast by the dynamic contrast processing being below a predetermined value, the signal processing device may be configured to control the strength of the sharpness to be at a first level while adjusting the sharpness, and in response to the amount or slope of amplification of contrast by the dynamic contrast processing exceeding the predetermined value, the signal processing device may be configured to control the strength of the sharpness to be at a second level lower than the first level while adjusting the sharpness. Accordingly, noise amplification can be reduced, or sharpness can be improved. In particular, noise amplification in a low gray level area can be reduced, or sharpness in a high gray level area can be improved.

Meanwhile, the signal processing device may be configured to gradually change the strength of the sharpness from the first level to the second level or from the second level to the first level, while adjusting the sharpness. Accordingly, noise amplification can be reduced, or sharpness can be improved.

11Meanwhile, while processing the dynamic contrast, in response to the gray level of the image signal being below the first gray level, the signal processing device may be configured to control the output luminance to be lower than the input luminance, and in response to the gray level of the image signal exceeding the first gray level, the signal processing device may be configured to control the output luminance to be higher than the input luminance. Accordingly, dynamic contrast processing can be efficiently performed.

Meanwhile, the signal processing device may be configured decrease noise amplification or increase the sharpness based on the amount of amplification of contrast by the dynamic contrast processing. Accordingly, noise amplification can be reduced, or sharpness can be improved.

Meanwhile, the signal processing device may be configured to adjust the sharpness of the image signal more in sports mode than in movie mode. Accordingly, noise amplification can be further reduced, or sharpness can be further improved.

Meanwhile, in response to the gray level of the image signal being below the first gray level, the signal processing device may be configured to decrease noise amplification, and in response to the gray level of the image signal exceeding the first gray level, the signal processing device may be configured to increase the sharpness. Thus, noise amplification can be reduced, or sharpness can be improved. In particular, noise amplification in a low gray level area can be reduced, or sharpness in a high gray level area can be improved.

Meanwhile, while processing the dynamic contrast, the signal processing device may be configured to change the color spectrum of the image signal based on contrast gain. Accordingly, noise amplification can be reduced, or sharpness can be improved.

Meanwhile, while processing the dynamic contrast, the signal processing device may be configured to increase the color spectrum of the image signal as contrast gain increases, and decrease the color spectrum of the image signal as the contrast gain decreases. Accordingly, dynamic contrast processing can be efficiently performed.

According to another embodiment of the present disclosure, an image display apparatus may comprise: a display; and a signal processing device to output an image signal to the display, wherein the signal processing device is configured to perform dynamic contrast processing after performing sharpness processing of the image signal, and in response to the amount or slope of amplification of contrast by the dynamic contrast processing exceeding a predetermined value, the signal processing device is configured to decrease the strength of the sharpness while adjusting the sharpness. Accordingly, noise amplification can be reduced, or sharpness can be improved. In particular, noise amplification in a low gray level area can be reduced, or sharpness in a high gray level area can be improved.

Meanwhile, while adjusting the sharpness, the signal processing device may be configured to decrease the strength of the sharpness as the amount of slope of amplification increases, in a state in which the amount or slope of amplification of contrast by the dynamic contrast processing exceeds a predetermined value. Accordingly, noise amplification can be reduced, or sharpness can be improved.

Meanwhile, in response to the amount or slope of amplification of contrast by the dynamic contrast processing being below the predetermined value, the signal processing device may not adjust the sharpness. Accordingly, sharpness adjustment can be efficiently performed.

According to further another embodiment of the present disclosure, an image display apparatus may comprise: a display; and a signal processing device to output an image signal to the display, wherein the signal processing device is configured to perform dynamic contrast processing after performing sharpness processing of the image signal, and in response to the amount or slope of amplification of contrast by the dynamic contrast processing being below a predetermined value, the signal processing device is configured to control the strength of the sharpness to be at a first level while adjusting the sharpness, and in response to the amount or slope of amplification of contrast by the dynamic contrast processing exceeding the predetermined value, the signal processing device is configured to control the strength of the sharpness to be at a second level lower than the first level while adjusting the sharpness. Accordingly, noise amplification can be reduced, or sharpness can be improved. In particular, noise amplification in a low gray level area can be reduced, or sharpness in a high gray level area can be improved.

Meanwhile, the signal processing device may be configured to gradually change the strength of the sharpness from the first level to the second level or from the second level to the first level, while adjusting the sharpness. Accordingly, noise amplification can be reduced, or sharpness can be improved.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. An image display apparatus comprising:

a display; and a signal processing device to output an image signal to the display, wherein the signal processing device is configured to:

perform noise reduction of the image signal;

perform sharpness processing by increasing the sharpness gain for some components of noise-reduced image signal after performing the noise reduction;

perform dynamic contrast processing of sharpness-processed image signal after performing the sharpness processing; and after performing the dynamic contrast processing, adjust the sharpness of dynamic contrast-processed image signal based on amount or slope of amplification of contrast by the dynamic contrast processing.

2. The image display apparatus of claim 1, wherein, in response to an increase of the amount or slope of amplification of contrast by the dynamic contrast processing, the signal processing device is configured to decrease strength of the sharpness while adjusting the sharpness.

3. The image display apparatus of claim 1, wherein, in response to the amount or slope of amplification of contrast by the dynamic contrast processing exceeding a predetermined value, the signal processing device is configured to decrease the strength of the sharpness while adjusting the sharpness.

4. The image display apparatus of claim 3, wherein, in response to the amount or slope of amplification of contrast by the dynamic contrast processing being below the predetermined value, the signal processing device is configured to not adjust the sharpness.

5. The image display apparatus of claim 1, wherein, while adjusting the sharpness, the signal processing device is configured to decrease the strength of the sharpness as the amount of slope of amplification increases in a state in which the amount or slope of amplification of contrast by the dynamic contrast processing exceeds a predetermined value.

6. The image display apparatus of claim 1, wherein, while adjusting the sharpness, the signal processing device is configured to increase the strength of the sharpness as the amount or slope of amplification of contrast by the dynamic contrast processing decreases.

7. The image display apparatus of claim 1, wherein, while adjusting the sharpness, the signal processing device is configured to increase the strength of the sharpness as the amount or slope of amplification decreases in a state in which the amount or slope of amplification of contrast by the dynamic contrast processing is below a predetermined value.

8. The image display apparatus of claim 1, wherein, in response to the amount or slope of amplification of contrast by the dynamic contrast processing being below a predetermined value, the signal processing device is configured to control the strength of the sharpness to be at a first level while adjusting the sharpness, and wherein, in response to the amount or slope of amplification of contrast by the dynamic contrast processing exceeding the predetermined value, the signal processing device is configured to control the strength of the sharpness to be at a second level lower than the first level while adjusting the sharpness.

9. The image display apparatus of claim 8, wherein, while adjusting the sharpness, the signal processing device is configured to gradually change the strength of the sharpness from the first level to the second level or from the second level to the first level.

10. The image display apparatus of claim 1, wherein, while processing the dynamic contrast, in response to the gray level of the image signal being below the first gray level, the signal processing device is configured to control the output luminance to be lower than the input luminance, and wherein, while processing the dynamic contrast, in response to the gray level of the image signal exceeding the first gray level, the signal processing device is configured to control the output luminance to be higher than the input luminance.

11. The image display apparatus of claim 1, wherein the signal processing device is configured to adjust the sharpness of the image signal more in sports mode than in movie mode.

12. The image display apparatus of claim 1, wherein, while processing the dynamic contrast, the signal processing device is configured to change the color spectrum of the image signal based on contrast gain.

13. An image display apparatus comprising:

a display; and a signal processing device to output an image signal to the display, wherein the signal processing device is configured to;

perform noise reduction of the image signal;

perform sharpness processing by increasing the sharpness gain for some components of noise-reduced image signal after performing the noise reduction;

perform dynamic contrast processing of sharpness-processed image signal after performing the sharpness processing; and after performing the dynamic contrast processing, adjust the sharpness of dynamic contrast-processed image signal based on amount or slope of amplification of contrast by the dynamic contrast processing, wherein, in response to the amount or slope of amplification of contrast by the dynamic contrast processing exceeding a predetermined value, the signal processing device is configured to decrease the strength of the sharpness while adjusting the sharpness.

14. The image display apparatus of claim 13, wherein, while adjusting the sharpness, the signal processing device is configured to decrease the strength of the sharpness as the amount of slope of amplification increases in a state in which the amount or slope of amplification of contrast by the dynamic contrast processing exceeds a predetermined value.

15. The image display apparatus of claim 13, wherein, in response to the amount or slope of amplification of contrast by the dynamic contrast processing being below the predetermined value, the signal processing device is configured to not adjust the sharpness.

16. An image display apparatus comprising:

a display; and a signal processing device to output an image signal to the display, wherein the signal processing device is configured to;

perform noise reduction of the image signal;

perform sharpness processing by increasing the sharpness gain for some components of noise-reduced image signal after performing the noise reduction;

perform dynamic contrast processing of sharpness-processed image signal after performing the sharpness processing, and after performing the dynamic contrast processing, adjust the sharpness of dynamic contrast-processed image signal based on amount or slope of amplification of contrast by the dynamic contrast processing, wherein, in response to the amount or slope of amplification of contrast by the dynamic contrast processing being below a predetermined value, the signal processing device is configured to control the strength of the sharpness to be at a first level while adjusting the sharpness, and wherein, in response to the amount or slope of amplification of contrast by the dynamic contrast processing exceeding the predetermined value, the signal processing device is configured to control the strength of the sharpness to be at a second level lower than the first level while adjusting the sharpness.

17. The image display apparatus of claim 16, wherein, while adjusting the sharpness, the signal processing device is configured to gradually change the strength of the sharpness from the first level to the second level or from the second level to the first level.

* * * * *